United States Patent
Jang

(10) Patent No.: US 11,047,382 B2
(45) Date of Patent: Jun. 29, 2021

(54) VARIABLE DISPLACEMENT GEAR PUMP

(71) Applicant: Soon Gil Jang, Seoul (KR)

(72) Inventor: Soon Gil Jang, Seoul (KR)

( * ) Notice: Subject to any disclaimer, the term of this patent is extended or adjusted under 35 U.S.C. 154(b) by 29 days.

(21) Appl. No.: 16/732,598

(22) Filed: Jan. 2, 2020

(65) Prior Publication Data

US 2020/0141405 A1     May 7, 2020

Related U.S. Application Data

(62) Division of application No. 15/579,196, filed as application No. PCT/KR2016/006390 on Jun. 16, 2016, now abandoned.

(30) Foreign Application Priority Data

Aug. 12, 2015  (KR) .......................... 10-2015-0113627
Jan. 27, 2016  (KR) .......................... 10-2016-0009861

(51) Int. Cl.
  *F03C 2/00*     (2006.01)
  *F03C 4/00*     (2006.01)
  (Continued)

(52) U.S. Cl.
  CPC ............ *F04C 14/185* (2013.01); *F01C 21/10* (2013.01); *F04C 2/084* (2013.01); *F04C 2/10* (2013.01);
  (Continued)

(58) Field of Classification Search
  CPC .. F04C 2/084; F04C 2/10; F04C 2/101; F04C 2/14; F04C 2/18; F04C 2/22;
  (Continued)

(56) References Cited

U.S. PATENT DOCUMENTS 4,740,142 A * 4/1988 Rohs ..................... F04C 14/185
                                                    418/21
5,306,127 A * 4/1994 Kinney ................. F04C 14/185
                                                    418/21
(Continued)

FOREIGN PATENT DOCUMENTS

JP     2000-120559     4/2000
JP     2002-106476     4/2002
(Continued)

OTHER PUBLICATIONS

English Specification of 10-2014-0140011.
(Continued)

*Primary Examiner* — Theresa Trieu
(74) *Attorney, Agent, or Firm* — Antonio Ha & U.S. Patent, LLC

(57) ABSTRACT

A variable displacement gear pump comprises a fixed gear, a movable gear movable, a fixed gear ring fitted over the movable gear, a movable gear ring fitted over the fixed gear, a fixed cover having a hole in which the fixed gear ring rotates, a movable cover having a hole in which the movable gear ring rotates, a fixed gear block attached to the fixed cover, and a movable gear block attached to the movable cover. The fixed gear is engaged with the movable gear. The movable gear ring rotates in the hole of the movable cover, and the fixed gear ring rotates in the hole of the fixed cover. The movable gear, together with the movable cover, the movable gear, and the movable gear block, move along the direction of the shaft to change a width in which the fixed gear is engaged with the movable gear.

2 Claims, 45 Drawing Sheets

(51) Int. Cl.
*F04C 2/00* (2006.01)
*F04C 14/18* (2006.01)
*F04C 2/18* (2006.01)
*F04C 2/22* (2006.01)
*F04C 2/10* (2006.01)
*F01C 21/10* (2006.01)
*F04C 2/08* (2006.01)
*F04C 11/00* (2006.01)
*F16H 61/00* (2006.01)

(52) U.S. Cl.
CPC .............. *F04C 2/101* (2013.01); *F04C 2/102* (2013.01); *F04C 2/18* (2013.01); *F04C 2/22* (2013.01); *F04C 11/001* (2013.01); *F16H 61/0025* (2013.01)

(58) Field of Classification Search
CPC ...... F04C 11/001; F04C 14/185; F01C 21/10; F01C 21/102; F01C 21/108; F16H 61/0025
See application file for complete search history.

(56) References Cited

U.S. PATENT DOCUMENTS

| | | | | | |
|---|---|---|---|---|---|
| 5,724,812 | A | * | 3/1998 | Baker | ................... F04C 11/003 418/21 |
| 6,659,748 | B1 | * | 12/2003 | Arbogast | ................. F04C 2/101 418/126 |
| 2001/0024618 | A1 | * | 9/2001 | Winmill | ................ F04C 14/185 418/1 |
| 2009/0110584 | A1 | * | 4/2009 | O'Brien, II | ........... F04C 14/185 418/21 |
| 2012/0219448 | A1 | * | 8/2012 | Lamparski | ............ F04C 14/185 418/206.9 |
| 2013/0004357 | A1 | * | 1/2013 | Sexton | .................... F04C 15/06 418/15 |

FOREIGN PATENT DOCUMENTS

| | | |
|---|---|---|
| JP | 2008-286147 | 11/2008 |
| KR | 10-2003-0027807 | 4/2003 |
| KR | 10-2007-0091151 | 9/2007 |
| KR | 10-2011-0045442 | 5/2011 |
| KR | 10-2013-0020782 | 2/2013 |
| KR | 10-2014-0140011 | 12/2014 |

OTHER PUBLICATIONS

English Specification of 10-2013-0020782.
English Specification of 2008-286147.
English Specification of 2002-106476.
English Specification of 2000-120559.
English Specification of 10-2007-0091151.
English Specification of 10-2011-0045442.
English Specification of 10-2003-0027807.

* cited by examiner

VARIABLE DISPLACEMENT GEAR PUMP

CROSS-REFERENCE TO RELATED APPLICATIONS

This patent application is a divisional application of U.S. patent application Ser. No. 15/579,196, filed on Dec. 2, 2017, which is a national-stage application of PCT/KR2016/006390 filed on Jun. 16, 2016, which claims priority under 35 U.S.C. § 119 to Korean Patent Application Nos. 10-2015-0113627, filed on Aug. 12, 2015, and 10-2016-0009861, filed on Jan. 27, 2016, in the Korean Intellectual Property Office, the disclosures of which are incorporated by reference herein in their entireties.

TECHNICAL FIELD

A hydraulic pump or hydraulic motor may be made of a vane, a piston, or a gear and has different characteristics. A hydraulic pump or hydraulic motor using a gear presents more difficulty than one using a vane or piston in producing it a variable displacement type.

DISCUSSION OF RELATED ART

A hydraulic gear pump and a hydraulic gear motor have the same basic structure, and they may be classified into an external, internal, or trochoid type. In light of the present invention, the lobe pump has the same structure as the external gear pump. The hydraulic gear pump creates a flow of fluid as the gears repetitively engage and disengage. As the flowrate is proportional to the width in which the gears are engaged with each other, if the width can be changed, the amount of fluid discharged may also be varied. The width in which two gears are engaged with each other may easily be changed by moving the gears in opposite directions along the gear shafts, but this way may cause an undesired fluid leak. Various efforts to prevent such fluid leak have conventionally been attempted—e.g., fitting one ring in or over one or each of the non-engaged portions of the two gears or adopting one or more blocks that abut the tips of the gear teeth, sleeves, or holes or one or more sleeves that surround the gears, shafts, or blocks to prevent the fluid from leaking between the teeth of the gears. Another conventional way is to form holes through the rings allowing the fluid to pass therethrough. However, the conventional methods are too tricky to be employed for producing variable displacement gear pumps, are prone to miss, or fail to, address hidden issues, or cause excessive cost consumption, resultantly less competitive and popular as compared with vane- or piston-type variable displacement pumps. The present invention is subsequent to the invention disclosed in Korean Patent Application Publication No. 10-2014-0140011 and International Patent Application Publication No. WO 2014178483 and figures out the problems that have thus far been found.

SUMMARY

The present invention aims to provide a simplified method for using a gear ring and a gear block to prevent fluid from leaking to an undesired place when shifting the gears of a variable displacement gear pump to change the width in which the gears are engaged with each other. This allows variable displacement gear pumps to enjoy the major properties of gear pumps, e.g., simplified structure and better economy. Thus, variable displacement gear pumps and variable displacement gear motors which are more competitive than vane- or piston-type pumps may easily be produced for commercial purposes. Hereinafter, the hydraulic gear pump is described but it should be appreciated that the present invention may also be applied to the hydraulic gear motor.

The present invention adopts the following means to achieve the foregoing objects.

In case of a variable displacement external gear pump, one gear is left to rotate in place inside the casing, while another gear rotating engaged with the one gear is rendered to move in the direction of the shaft. By doing so, the width in which the two gears are engaged with each other may be changed to adjust the amount of fluid discharged. A gear block and a gear block hole are provided between each gear and the casing, and a gear ring is provided between each gear and the casing cover, preventing a fluid leak.

In case of a variable displacement trochoid gear pump, one gear is left to rotate in place inside the casing, while another gear rotating engaged with the one gear is rendered to move in the direction of the shaft, thereby changing the width in which the two gears are engaged with each other to adjust the amount of fluid discharged. A gear ring is provided between the moving gear and the casing cover, and a gear ring and a gear block are provided on a side surface of the gear moving inside the gear which rotates in place, preventing a fluid leak.

In case of a variable displacement internal gear pump, one gear is left to rotate in place inside the casing, while another gear rotating engaged with the one gear is rendered to move in the direction of the shaft, thereby changing the width in which the two gears are engaged with each other to adjust the amount of fluid discharged. A gear ring is provided between the moving gear and the casing cover, and a gear ring and a gear block are provided on a side surface of the gear moving inside the fixed gear, preventing a fluid leak. Crescent plates are divided for the fixed gear and the movable gear and each move through a respective corresponding crescent plate hole.

A minimalized change is made to the simple structure of the hydraulic gear pump or hydraulic gear motor, allowing for production of easy-to-produce, low-cost, more competitive variable displacement gear pumps or variable displacement gear motors. A variable displacement gear pump and a variable displacement gear motor each may be used stand-alone, or they may be used in combination in, e.g., continuously variable transmissions or transfer cases or for other various purposes.

BRIEF DESCRIPTION OF THE DRAWINGS

In FIG. 8, reference numerals 71, 72, 81, and 82 denote a fixed gear ring, a movable gearing, a fixed cover, and a movable cover, respectively.

In FIG. 32, reference numerals 326 and 327 denote fixed crescent plate holes.

In FIG. 35, reference numeral 351 denotes a crescent plate groove.

DETAILED DESCRIPTION OF EXEMPLARY EMBODIMENTS

A hydraulic gear pump and a hydraulic gear motor have the same basic structure. Thus, the description of the hydraulic gear pump may apply to the hydraulic gear motor as well. Generally, external, internal, and trochoid types of hydraulic gear pumps are used. The description of the external hydraulic gear pump may also apply to lobe pumps. According to the present invention, described are the structure of each of the three types of variable displacement gear pumps and a method therefor.

Figure 1:
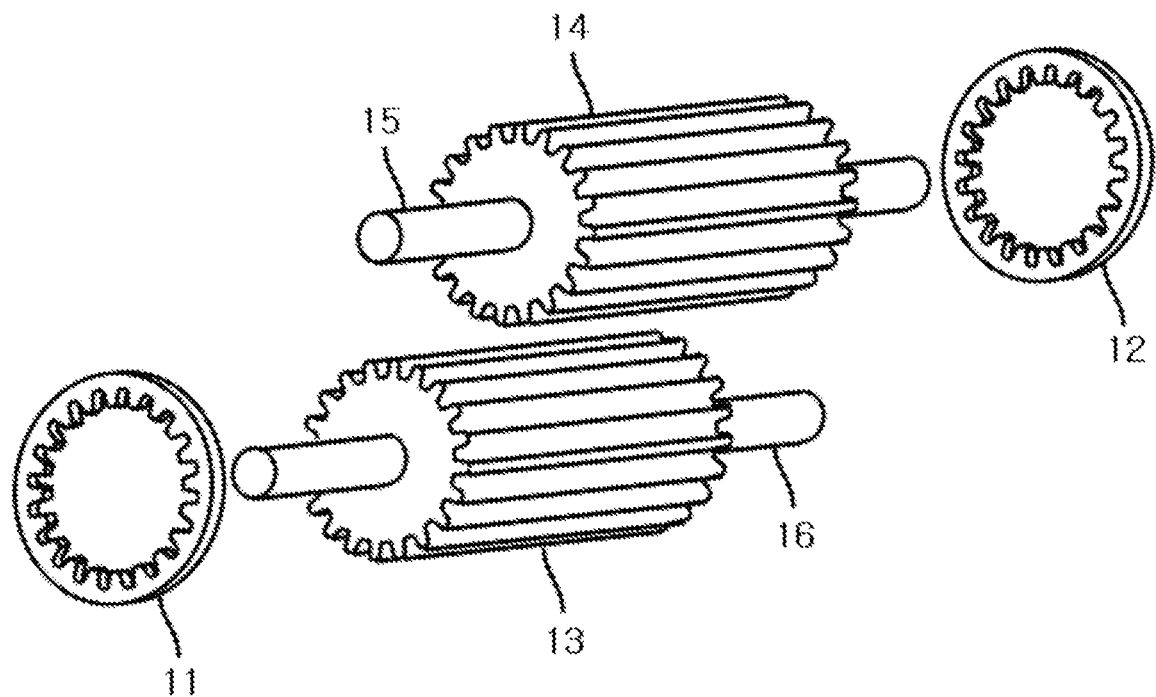
FIG. 1 illustrates a fixed gear ring 11, a movable gear ring 12, a fixed gear 14, and a movable gear 13 used in a variable displacement external gear pump. The fixed gear ring 11 may be fitted in the movable gear 13 to move to the left or right, and the movable gear ring 12 may be fitted in the fixed gear 14 to move to the left or right. No fluid leak occurs during the movement.
Figure 2:
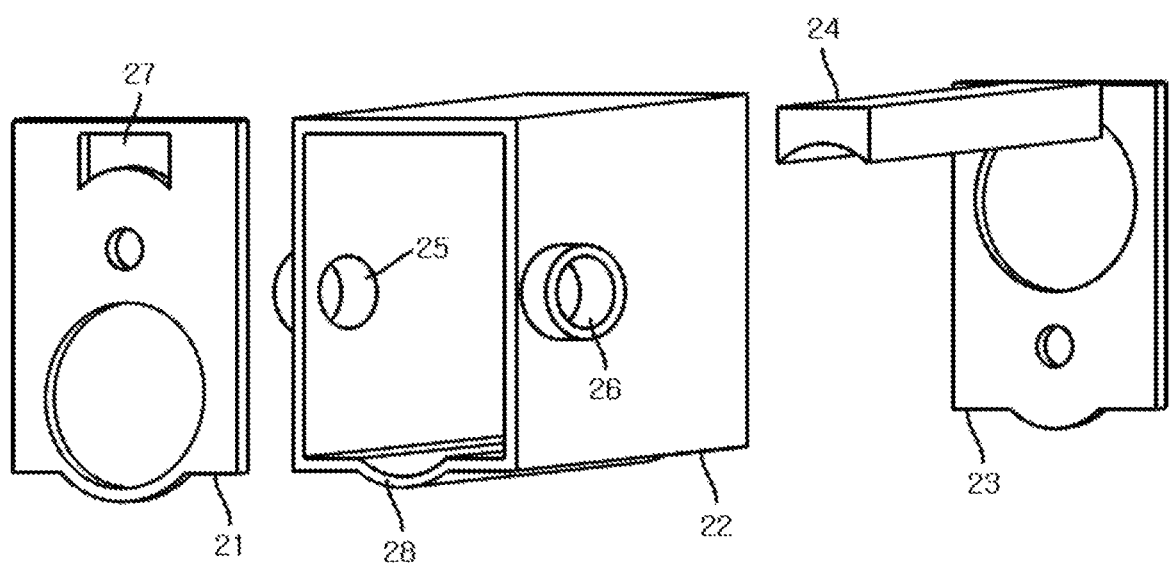
FIG. 2 illustrates a casing 22 with fluid ports 25 and 26, a fixed cover 21, a movable cover 23, a movable gear block 24, and a movable gear block hole 27 used in a variable displacement external gear pump. The movable gear block 24 is attached to the movable cover 23. The movable gear block 24 moves in contact with the ceiling inside the casing 22 and passes through the movable gear block hole 27.
Figure 42:
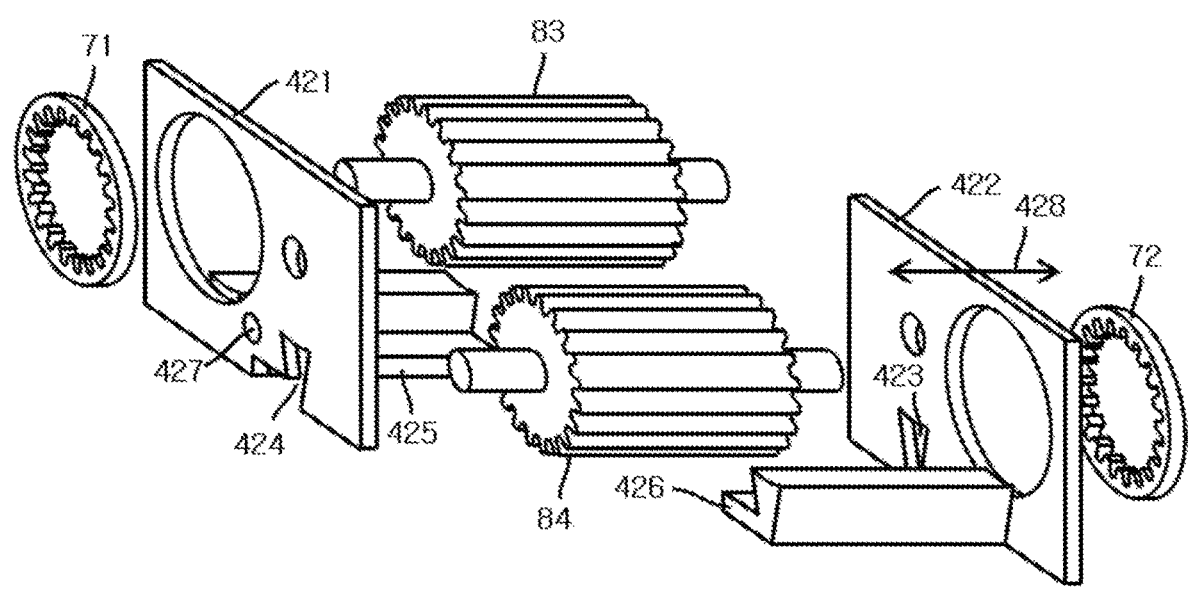
FIG. 42 illustrates another variation to the variable displacement external gear pump shown in FIGS. 1 to 7, wherein a fixed gear block 425 and a movable gear block 426 of which side surfaces contact each other are used. The two gears need to be soaked in the fluid, and no casing is used.
Figure 44:
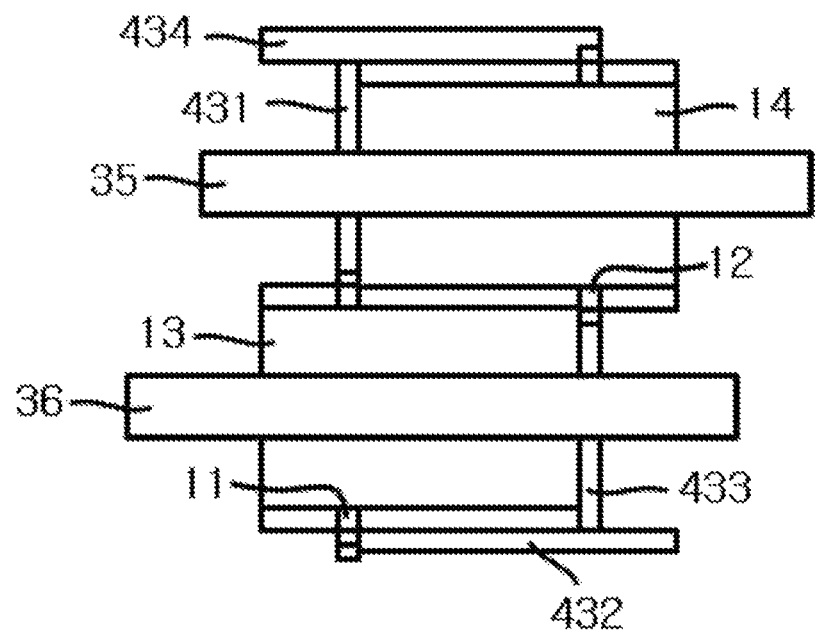
FIG. 44 is a cross-sectional view of FIG. 43.
Figure 45:
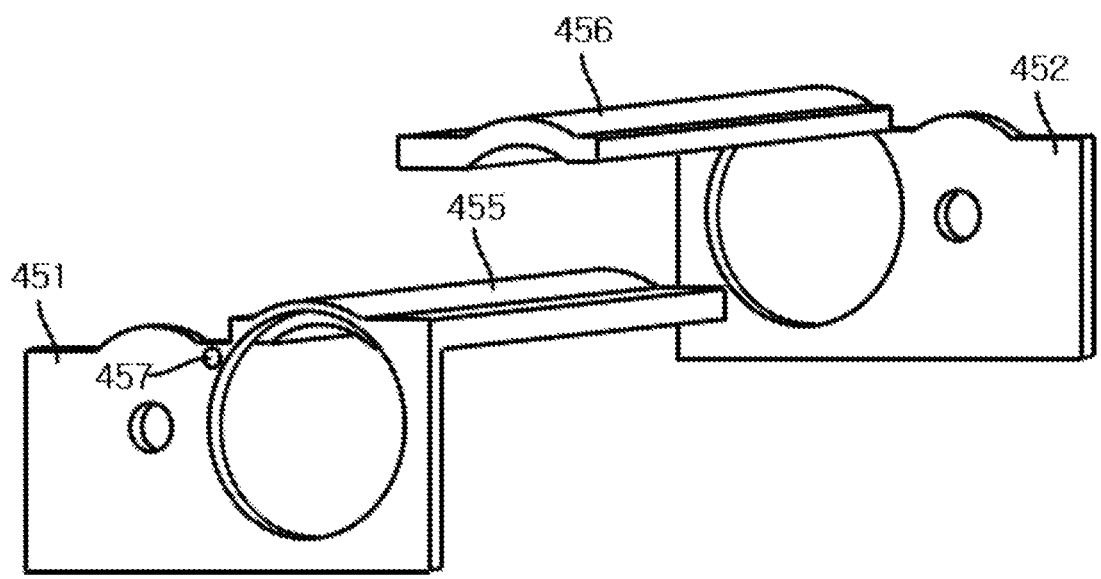
FIG. 45 illustrates another variation to the variable displacement external gear pump shown in FIGS. 1 to 7, wherein the casing 22, the movable gear block 24, and the movable gear block hole 28 are not used, but a fixed casing 455 and a movable casing 456 are instead used.

FIG. 1 illustrates a fixed gear ring 11, a movable gear ring 12, a fixed gear 14, and a movable gear 13 that constitute a variable displacement external gear pump. FIG. 2 illustrates a casing 22, a fixed cover 21, a movable cover 23, and a movable gear block hole 27. A portion of the casing 22, which abuts the teeth tips of the movable gear, is referred to as a fixed casing 28. The fixed gear 14 is fitted into the movable gear ring 12 and is installed using a smaller hole of the fixed cover 21 and a larger hole of the movable cover 23. The movable gear 13 is fitted into the fixed gear ring 11 and is installed using a larger hole of the fixed cover 21 and a smaller hole of the movable cover 23. The fixed gear ring 11 rotates in the larger hole of the fixed cover 21, and the fixed cover 21 is attached to the front of the casing 22. The movable gear ring 12 rotates in the larger hole of the movable cover 23, and the movable cover 23 moves to the left or right inside the casing 22. A movable gear block 24 is attached to the movable cover 23. The top of the movable gear block 24 reaches the ceiling of the casing 22, and the bottom of the movable gear block 24 reaches the teeth tips of the fixed gear 14. The movable gear block 24 passes and moves through the movable gear block hole 27 formed in the fixed cover 21. The movable gear 13 is engaged with the fixed gear 14 thereabove. The teeth tips of the movable gear 13 abut the casing 22. As the movable gear 13, the movable gear ring 12, the movable gear block 24, and the movable cover 23 together move to the left or right, the width in which the two gears are engaged with each other is changed, varying the amount of fluid discharged. The rectangular block-like shape of the casing 22 as shown in FIG. 2 is merely an example for a better understanding. The cross section of the movable gear block 24 and the movable gear block hole 27 are so shaped that the movable gear block 24 abuts the teeth tips of the fixed gear 14 and the casing 22, and are not limited to the shape shown in FIG. 2. Where the teeth tips of the movable gear 13 abut the casing 22 is not limited to the bottom of the casing 22, and where the movable gear block 24 abuts the casing 22 is not limited to the ceiling of the casing 22. By adjusting where the teeth tips of the movable gear 13 abut the casing 22 and where the movable gear block 24 abuts the casing 22, some of the top, bottom, left, and right portions of the casing 22 as shown in FIG. 2 may be removed. For example, where the variable displacement external gear pump is installed on the bottom of a fluid tank or the crank chamber in an internal combustion engine, the movable gear 13 and the fixed gear 14 may horizontally be arranged, with the gears soaked in the fluid, in which case only the bottom portion of the casing 22 may be provided. Such may be achieved by positioning the fixed gear 14 and the movable gear block 24 of FIGS. 1 to 7 side-by-side as shown in FIG. 8. FIG. 8 illustrates an example in which a fixed gear block 85 and a fixed gear block hole 73 are further used. In some cases, it may be hard to precise process the bottom portion. In preparation for such case, a pump even free of the bottom portion is shown in FIG. 42. A method for avoiding use of the gear block and gear block hole is disclosed in FIGS. 43 and 44. A method for eliminating use of the casing is shown in FIG. 45.

According to the present invention, the variable displacement external gear pump uses a gear ring for each of the two gears. A gear block is placed where the gear directly abuts the casing between the teeth tips of the gear and the casing in the conventional external gear pump. The gear block hole is a hole for allowing the gear block to pass therethrough. One gear block may be placed between one gear and the casing or between each of the two gears and the casing, or no gear block may be used. The variable displacement external gear pump shown in FIGS. 1 to 7 adopts the gear block for only one of the gears, the variable displacement external gear pump shown in FIGS. 8, 9, and 41 adopts the gear block for each of the two gears, and the gear pump shown in FIGS. 43 to 45 adopts no gear block.

Figure 3:
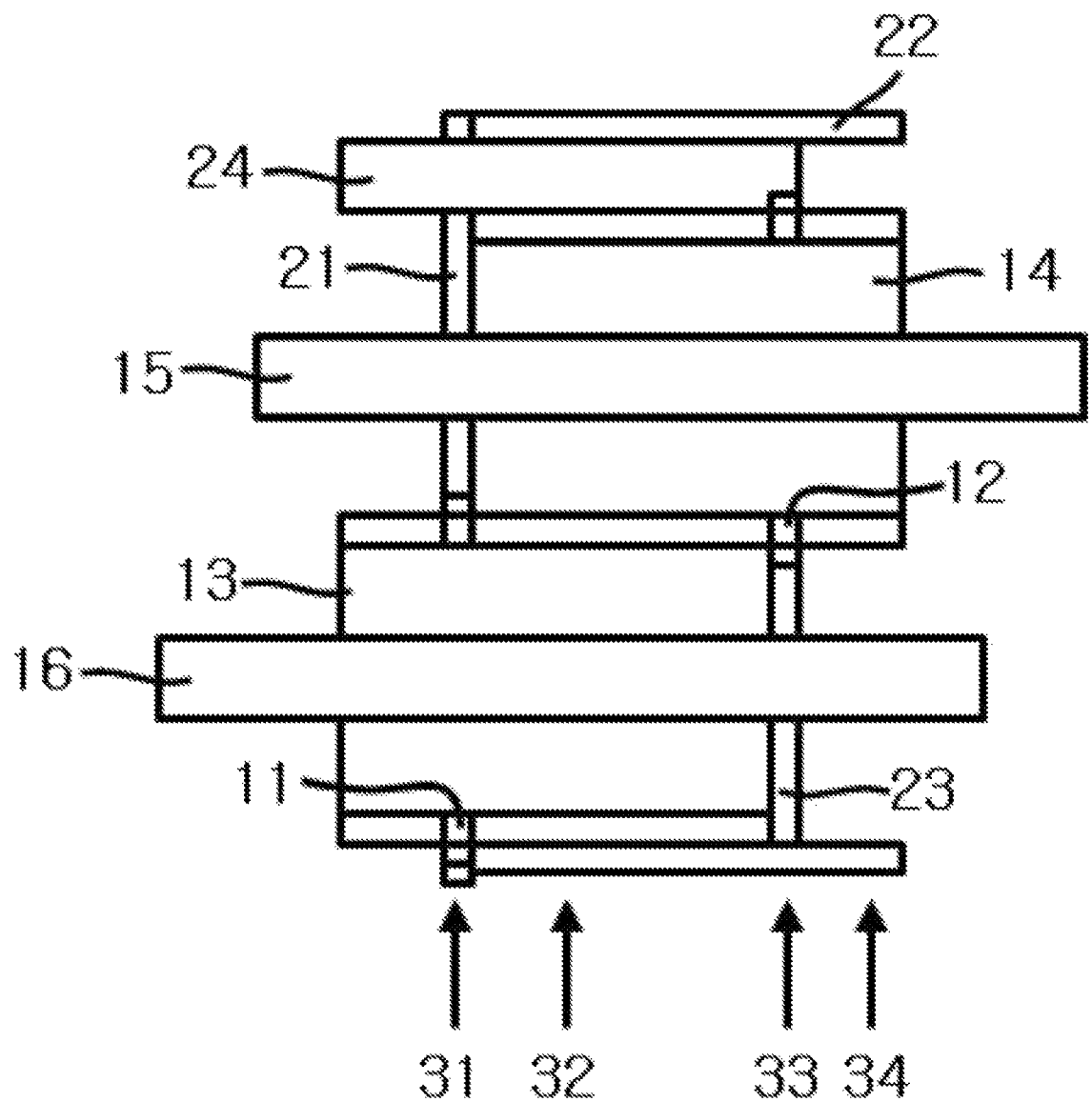
FIG. 3 illustrates a cross section of a variable displacement external gear pump that has been assembled and is being operated.

FIG. 3 illustrates a cross section of a variable displacement external gear pump assembled and being in operation. Cross sections taken in the positions denoted with reference numbers 31 to 34 are shown in FIGS. 4 to 7 for describing the assembly and operation state in greater detail.

Figure 4:
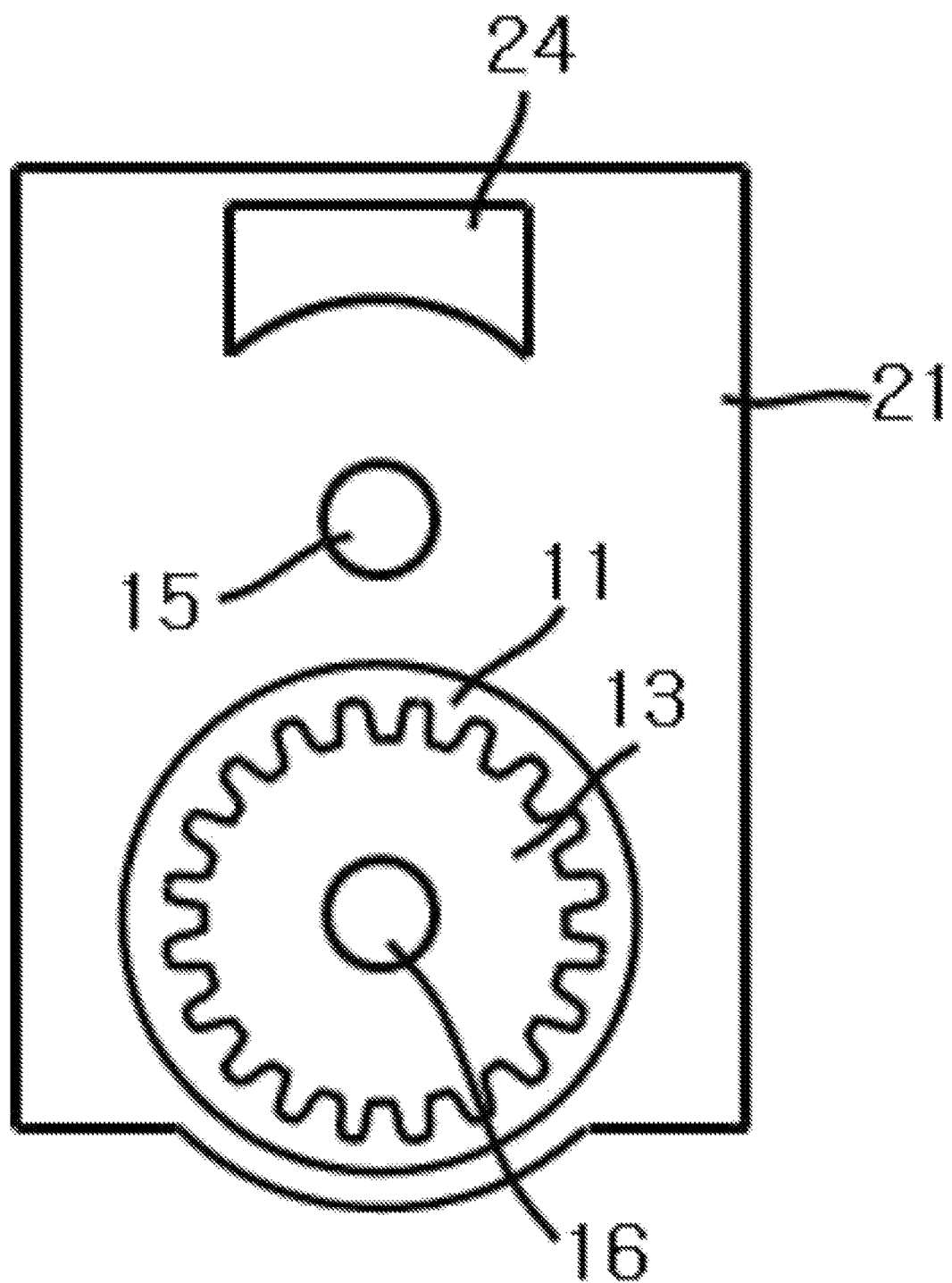
FIG. 4 is a cross-sectional view taken in the position denoted with an arrow 31 of FIG. 3.

FIG. 4 is a cross-sectional view taken in the position denoted with arrow 31 of FIG. 3. The fixed gear ring 11 is placed in the larger hole of the fixed cover 21, and the movable gear 13 is fitted in the gear ring 11. A fixed gear shaft 15 passes through the smaller hole of the fixed cover 21, and the movable gear block 24 passes through the movable gear block hole 27 of the fixed cover 21.

Figure 5:
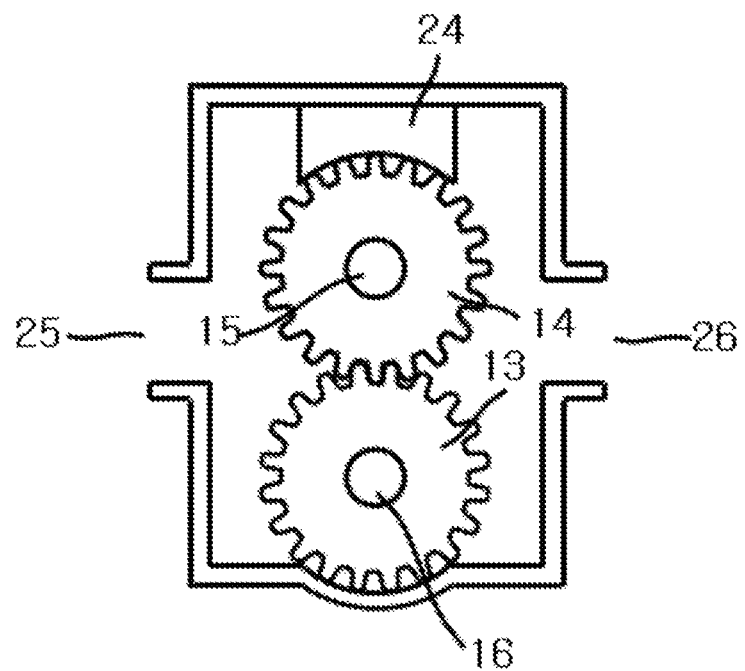
FIG. 5 is a cross-sectional view taken in the position denoted with an arrow 32 of FIG. 3.

FIG. 5 is a cross-sectional view taken in the position denoted with arrow 32 of FIG. 3. The fixed gear 14 and the movable gear 13 are engaged with each other in the casing 22. The fixed gear 14 abuts the movable gear block 24 thereabove.

Figure 6:
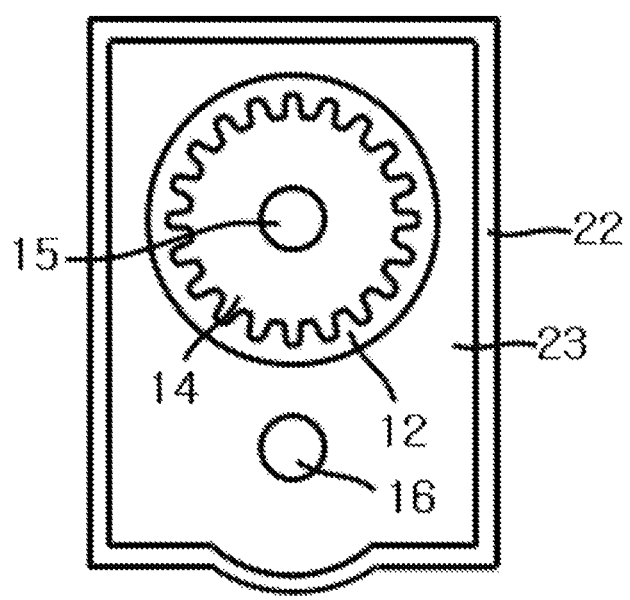
FIG. 6 is a cross-sectional view taken in the position denoted with an arrow 33 of FIG. 3.

FIG. 6 is a cross-sectional view taken in the position denoted with arrow 33 of FIG. 3. The movable cover 23 is positioned in the casing 22. The movable gear ring 12 is placed in the larger hole of the movable cover 23, and the fixed gear 14 is fitted in the movable gear ring 12. A movable gear shaft 16 passes through the smaller hole of the movable cover 23.

Figure 7:
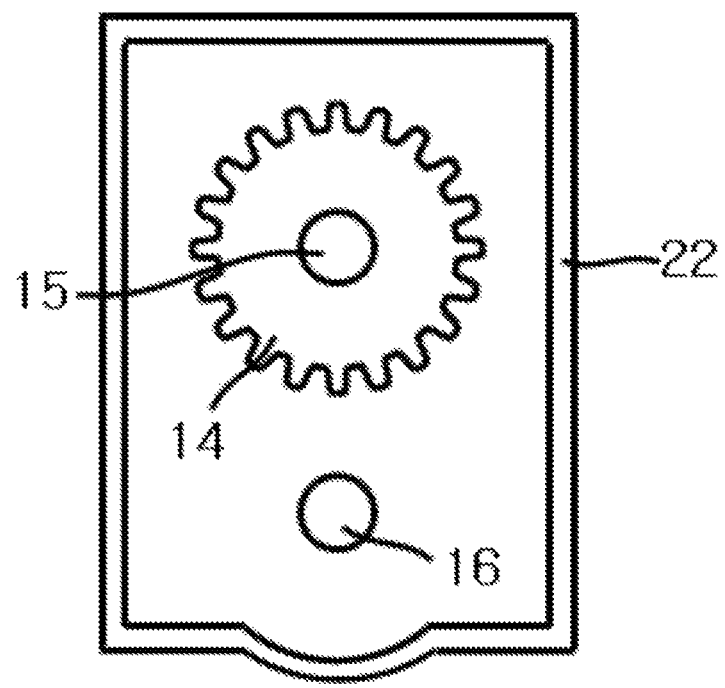
FIG. 7 is a cross-sectional view taken in the position denoted with an arrow 34 of FIG. 3.
Figure 8:
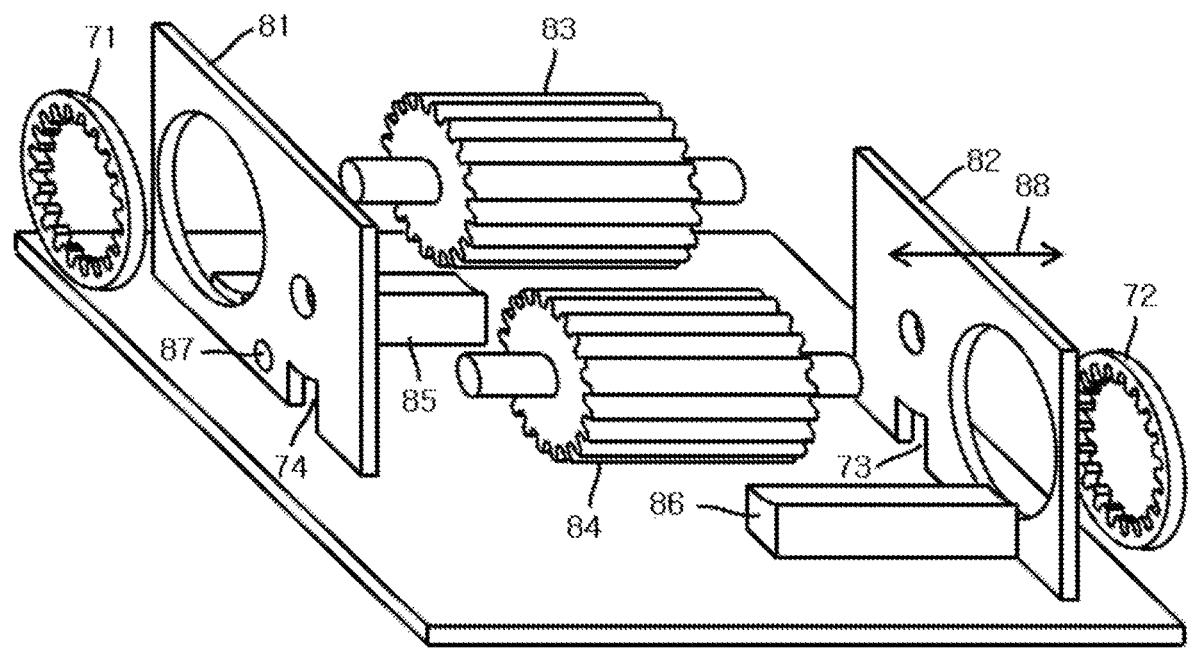
FIG. 8 illustrates a variation to the variable displacement external gear pump shown in FIGS. 1 to 7. A fixed gear block 85 and a movable gear block 86 together are used, and the two gears should be soaked in the fluid. The casing has a bottom plate, but no top and side plates.

FIG. 7 is a cross-sectional view taken in the position denoted with arrow 34 of FIG. 3. The fixed gear 14 and the movable gear shaft 16 are positioned in the casing 22.

It can be shown from FIGS. 3 to 6 that no fluid leak occurs. It can be shown from FIG. 5 that as the gears rotate, the fluid flows and that the amount of fluid discharged may be adjusted by repositioning the movable gear 13, the movable gear ring 12, the movable gear block 24, and the movable cover 23 in the casing 22.

FIG. 8 illustrates a variation to the variable displacement external gear pump of FIGS. 1 to 7. In comparison with the variable displacement external gear pump of FIGS. 1 to 7, a gear block and a gear block hole are added, and the arrangement is changed. The variable displacement external gear pump of FIG. 8 may easily be installed on the bottom of, e.g., an oil tank or crank chamber, without using the top and side portions of the casing. Where the top and side portions of the casing are absent, the pump needs to be operated with the two gears sufficiently soaked in the fluid. A fluid hole 87 may allow a pipe to connect therethrough and may be used as an outlet or inlet.

Figure 9:
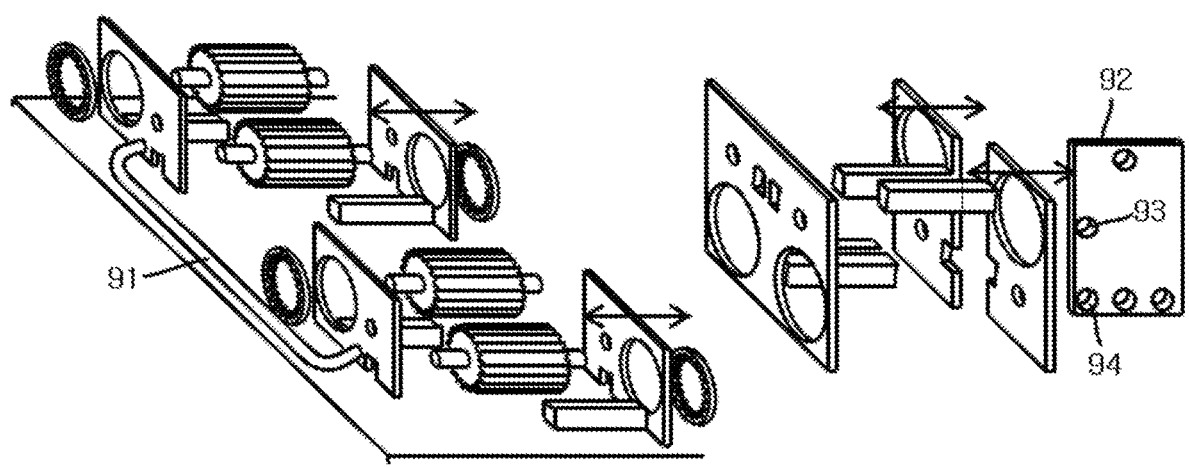
FIG. 9 illustrates two methods for forming a continuously variable transmission using the variable displacement external gear pump of FIG. 8. The four gears and the four gear rings are not shown in the right-hand view for simplicity.
Figure 43:
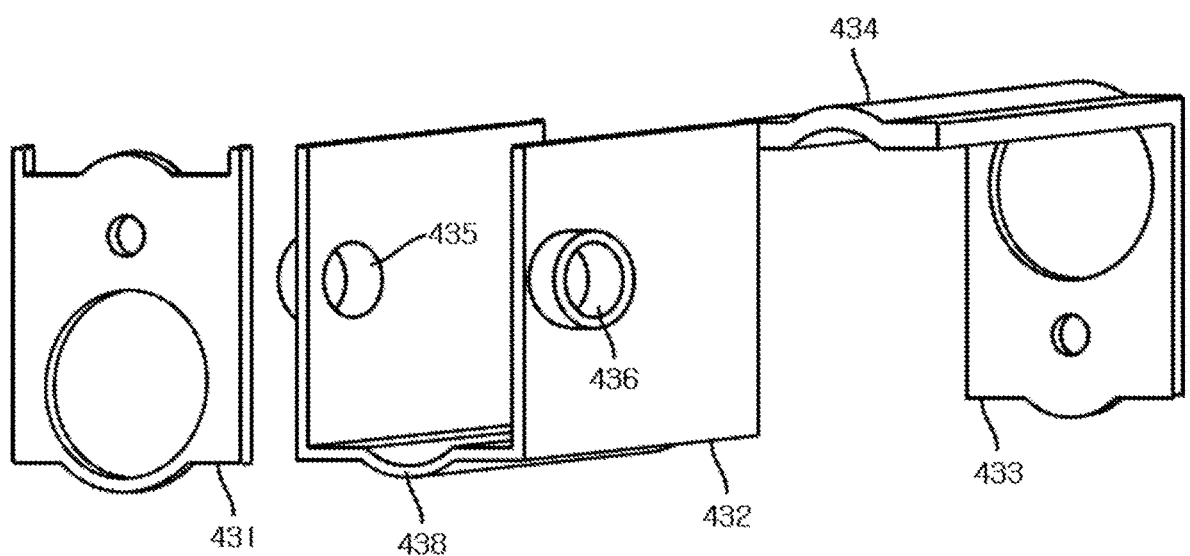
FIG. 43 illustrates another variation to the variable displacement external gear pump shown in FIGS. 1 to 7, wherein the movable gear block 24 and the movable gear block hole 27 are not used, but a movable casing 434 is instead used.

FIG. 9 illustrates two example methods for using the variable displacement external gear pump of FIG. 8 in a continuously variable transmission. A hydraulic pump and a hydraulic motor may be coupled together and used in the continuously variable transmission, in which case either or both of the hydraulic pump and the hydraulic motor may be of a variable displacement type, but more performance can be achieved when both the hydraulic pump and the hydraulic motor are of a variable displacement type. The left-hand view of FIG. 9 illustrates an example of connecting the hydraulic pump and the hydraulic pump through a fluid pipe 91 by applying the example of FIG. 8, and the right-hand view of FIG. 9 illustrates an example in which a partitioning wall 92 is provided between the pump and the motor, and a fluid hole 93 is bored in the partitioning wall 92 to replace the fluid pipe 91 on the left-hand view while saving use space. For ease of description, the four gears and the four gear rings are omitted from the right-hand view. Where the casing lacks the top and side portions, the gears need to be sufficiently soaked in the fluid. For the approaches shown in the left-hand view and right-hand view of FIG. 9, each variable displacement external gear pump is not limited to the variable displacement external gear pump shown in FIG. 8, but rather, a variable displacement external gear pump as shown in FIGS. 1 to 7, a variable displacement external gear pump as shown in FIG. 42, or a variable displacement external gear pump as shown in FIGS. 43 to 45 may also be adopted.

Figure 30:
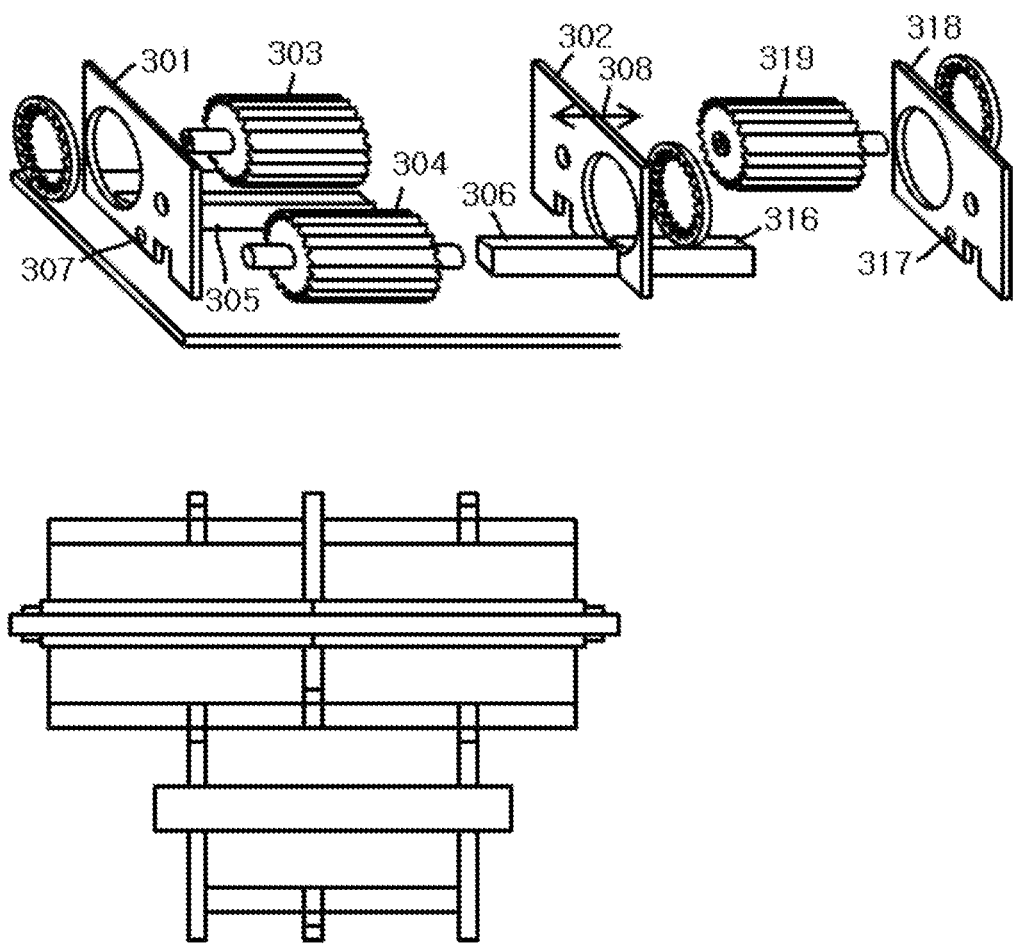
FIG. 30 illustrates a method for forming a continuously variable transfer case using a variable displacement external gear pump as shown in FIG. 8.

FIG. 30 illustrates a method for utilizing a variable displacement external gear pump as shown in FIG. 8 in a continuously variable transfer case, as an example. Two movable gears 303 and 319 move, engaged with one fixed gear 304. As a movable cover 302 moves along the moving direction 308 of the movable cover, the amount of fluid through two fluid holes 307 and 317 is varied. The two fluid holes 307 and 317 each may be connected to a respective fluid motor. The fixed gear 304 and the movable gears 303 and 319 need to be soaked in the fluid. The fluid is sucked in where the teeth of the three gears 304, 303, and 319 abut gear blocks 305, 306, and 316 as the gears rotate. A variable displacement external gear pump as used here is not the one shown in FIG. 8, and the variable displacement external gear pump of FIGS. 1 to 7, the variable displacement external gear pump of FIG. 42, or the variable displacement external gear pump of FIGS. 43 to 45 may also be used.

Figure 10:
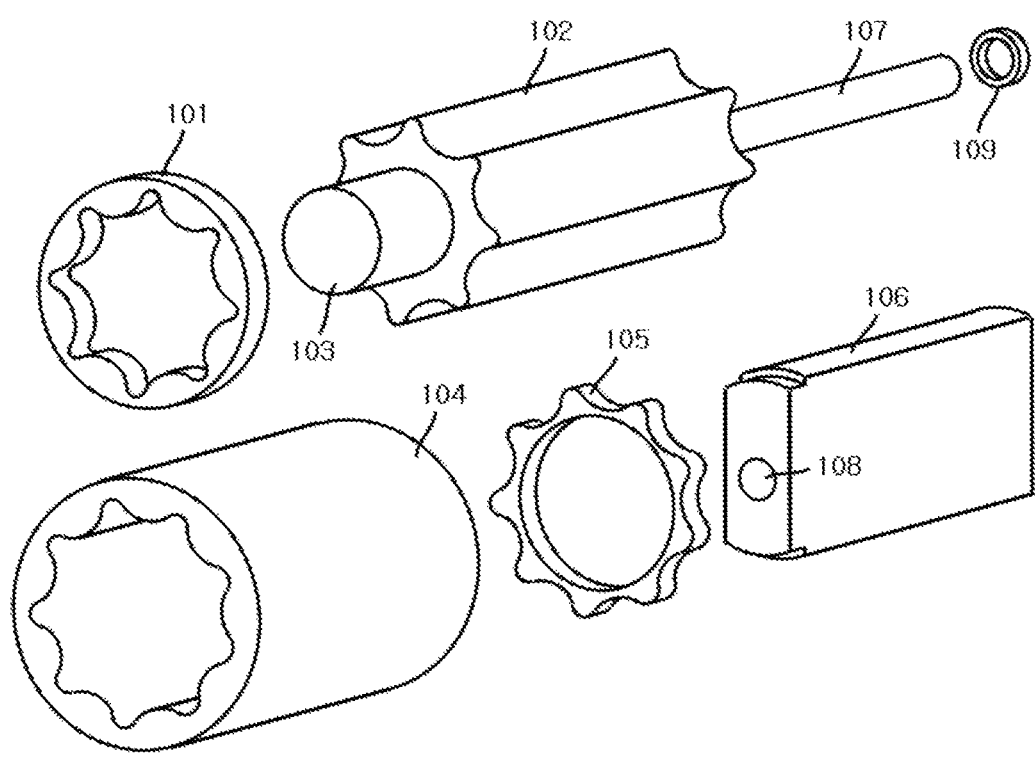
FIG. 10 illustrates a fixed gear ring 101, a movable gear 102, a movable gear shaft 103, a movable gear auxiliary shaft 107, a fixed gear 104, a movable gear ring 105, a gear block 106, a gear block hole 108, and a gear block fixing device 109 which are used in a variable displacement trochoid gear pump. The fixed gear ring 101 may be fitted over the movable gear 102 to move to the left or right without causing a fluid leak occurs. The movable gear ring 105 is assembled with the gear block 106 and fitted in the fixed gear 104 to move to the left or right while abutting the right side of the movable gear 102 without causing a fluid leak between the same and the fixed gear 104.
Figure 11:
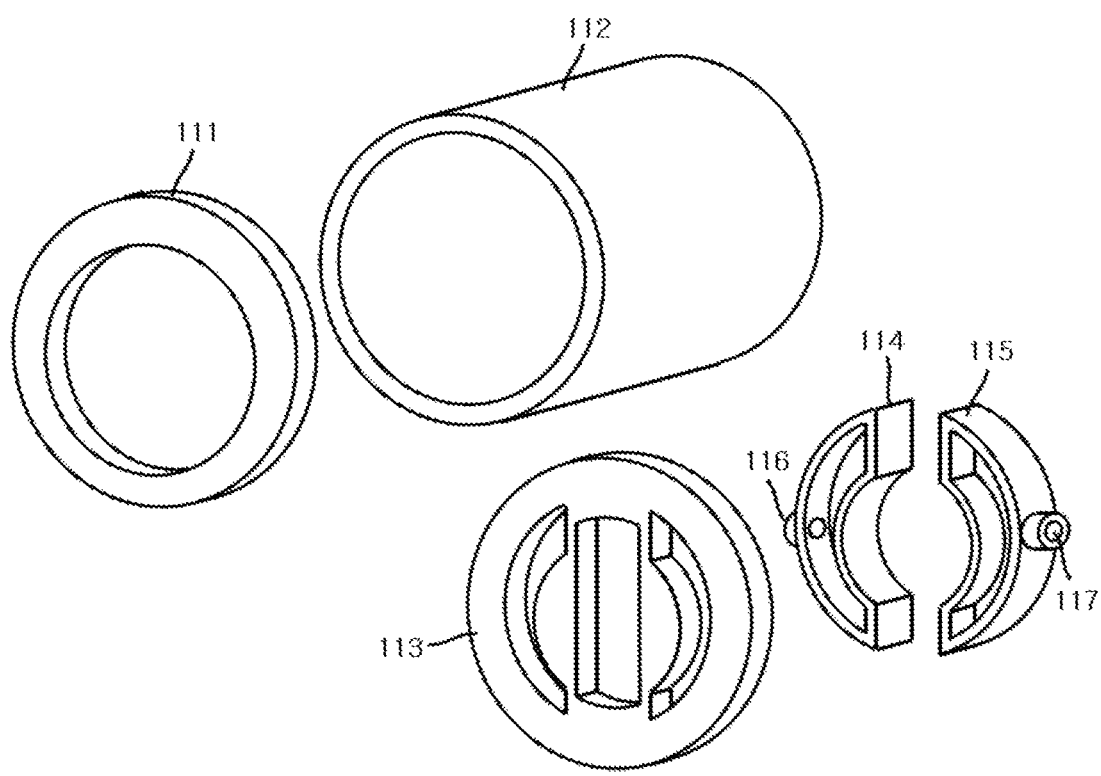
FIG. 11 illustrates a gear ring cover 111, a casing 112, a gear block cover 113, an inlet cover 114, and an outlet cover 115 which are used in a variable displacement trochoid gear pump.

FIG. 10 illustrates a fixed gear ring 101, a movable gear 102, a movable gear shaft 103, a fixed gear 104, a movable gear ring 105, a gear block 106, a movable gear auxiliary shaft 107, a gear block hole 108, and a gear block fixing device 109 that constitute a variable displacement trochoid gear pump. FIG. 11 illustrates a gear ring cover 111, a casing 112, a gear block cover 113, an inlet cover 114, an outlet cover 115, an inlet 116, and an outlet 117. The movable gear 102, the movable gear ring 105, and the gear block 106 are moved to the left or right inside the fixed gear 104 while abutting the fixed gear 104. The movable gear 102 and the movable gear ring 105 rotate together with the fixed gear 104. The fixed gear ring 101 is fitted over the movable gear 102 to rotate in the hole of the gear ring cover 111. The gear block 106 abuts two opposite teeth of the fixed gear 104 and moves through the hole of the gear block cover 113. As the movable gear 102, the movable gear ring 105, and the gear block 106 together move to the left or right, the width in which the two gears are engaged with each other is varied, changing the amount of fluid discharged. The shape of the teeth used in the movable gear 102 and the fixed gear 104 is not limited to a trochoid.

Figure 12:
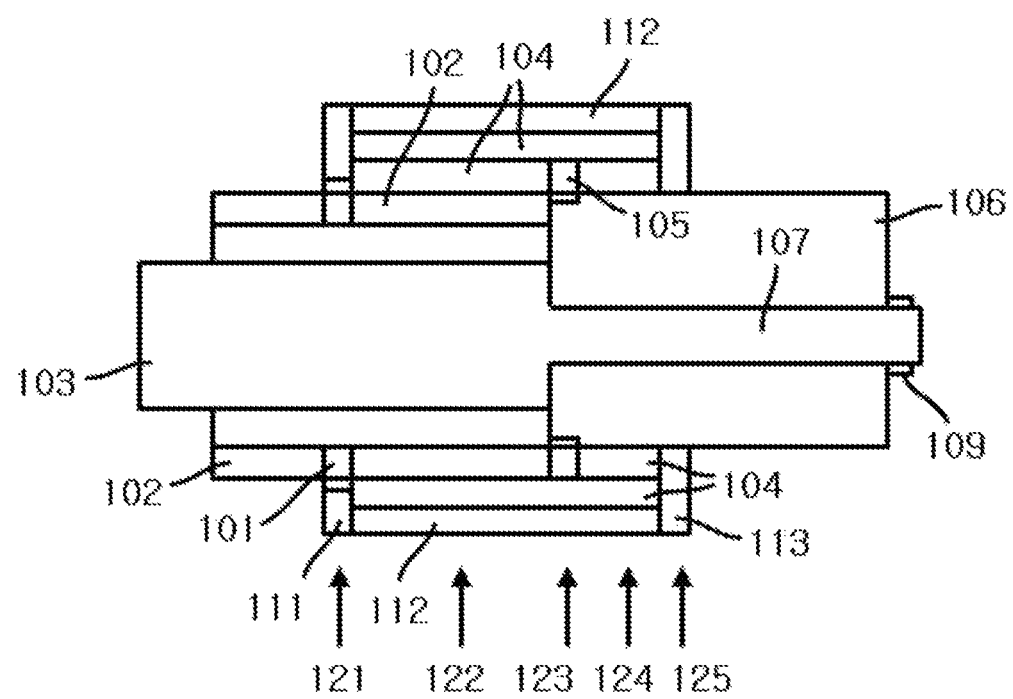
FIG. 12 is a cross-sectional view taken in the position denoted with an arrow 141 of FIG. 14, which illustrates a cross section of a variable displacement trochoid gear pump that has been assembled and is being operated.
Figure 13:
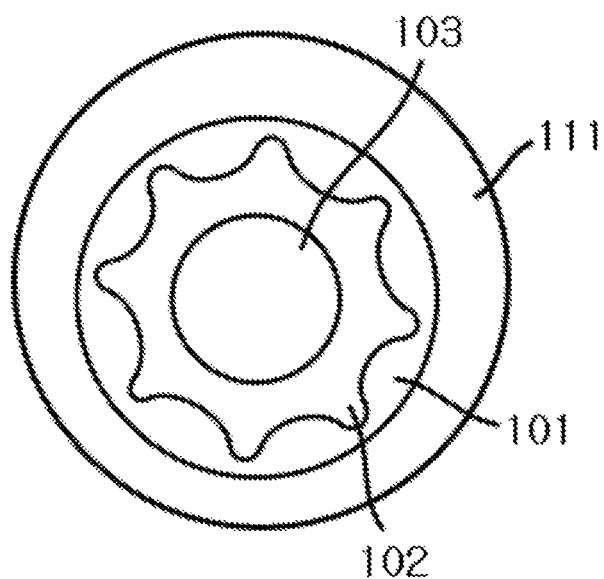
FIG. 13 is a cross-sectional view taken in the position denoted with an arrow 121 of FIG. 12.
Figure 14:
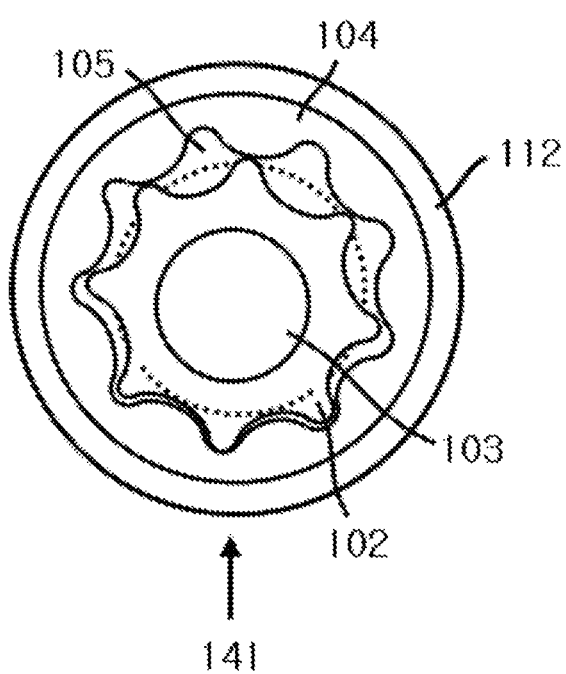
FIG. 14 is a cross-sectional view taken in the position denoted with an arrow 122 of FIG. 12.

FIG. 12 illustrates a cross section of an assembled variable displacement trochoid gear pump being in operation, which is taken in the position denoted with arrow 141 of FIG. 14. FIGS. 13 to 17 illustrate the cross sections taken in the positions denoted with reference numbers 121 to 125 to describe the assembly and operation state in greater detail.

FIG. 13 is a cross-sectional view taken in the position denoted with arrow 121 of FIG. 12. The fixed gear ring 101 is placed in the hole of the gear ring cover 111, and the movable gear 102 is fitted in the fixed gear ring 101.

FIG. 14 is a cross-sectional view taken in the position denoted with arrow 122 of FIG. 12. The fixed gear 104 is placed inside the casing 112, and the movable gear 102 is engaged with the fixed gear 104 to rotate inside the fixed gear 104. As the gears rotate, pumping is performed. The movable gear ring 105 denoted in dashed lines is shown simply to identify a relative position of the movable gear ring 105, and it indeed is located where the movable gear 102 ends, and in this case, the shape of the movable gear ring 105 and the gear block 106 may be identified in FIG. 15. As the movable gear ring 105 blocks the surroundings of ends of contact points where the fixed gear 104 is engaged in contact with the movable gear 102, a passage through which the fluid leaks, as described below with reference to FIG. 29, may be prevented from forming.

Figure 15:
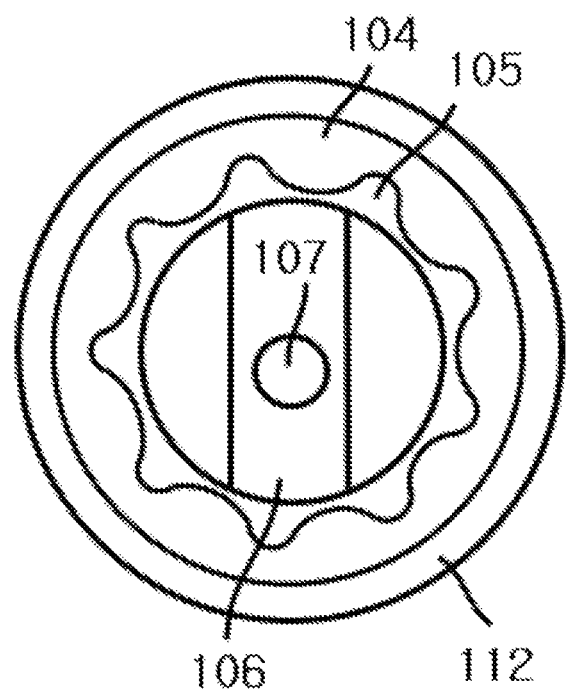
FIG. 15 is a cross-sectional view taken in the position denoted with an arrow 123 of FIG. 12

FIG. 15 is a cross-sectional view taken in the position denoted with arrow 123 of FIG. 12. The fixed gear 104 is placed inside the casing 112, and the movable gear ring 105 is fitted in the fixed gear 104. The gear block 106 is assembled at the center of the movable gear ring 105. The portions on the left and right of the gear block 106 are emptied as passages for the fluid.

Figure 16:
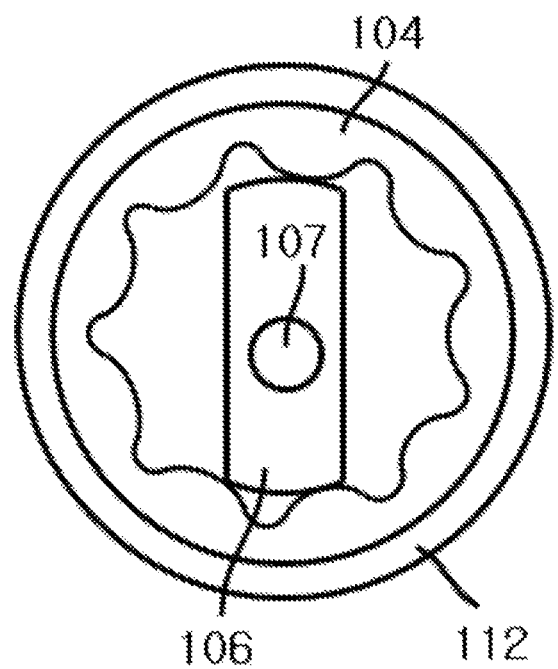
FIG. 16 is a cross-sectional view taken in the position denoted with an arrow 124 of FIG. 12.

FIG. 16 is a cross-sectional view taken in the position denoted with arrow 124 of FIG. 12. The fixed gear 104 is placed inside the casing 112. The gear block 106 abuts two opposite teeth of the fixed gear 104 inside the fixed gear 104 to divide the inside into an inlet side and an outlet side.

Figure 17:
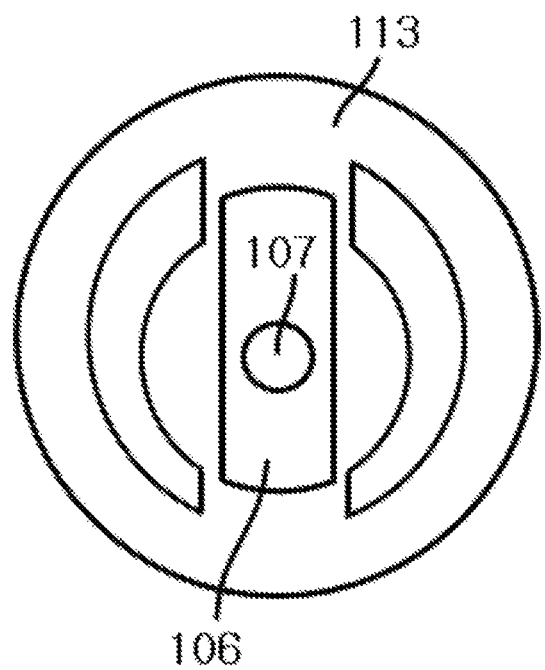
FIG. 17 is a cross-sectional view taken in the position denoted with an arrow 125 of FIG. 12.

FIG. 17 is a cross-sectional view taken in the position denoted with arrow 125 of FIG. 12. The gear block 106 passes through the inside of the gear block cover. Two holes are provided through which the fluid flows to the inlet and the outlet.

It may be identified from FIGS. 12 to 17 that the fluid does not leak. It may be identified from FIG. 14 that as the gears rotate, the fluid flows and that the amount of fluid discharged can be adjusted by repositioning the movable gear 102, the movable gear ring 105, and the gear block 106 inside the casing 112.

Figure 18:
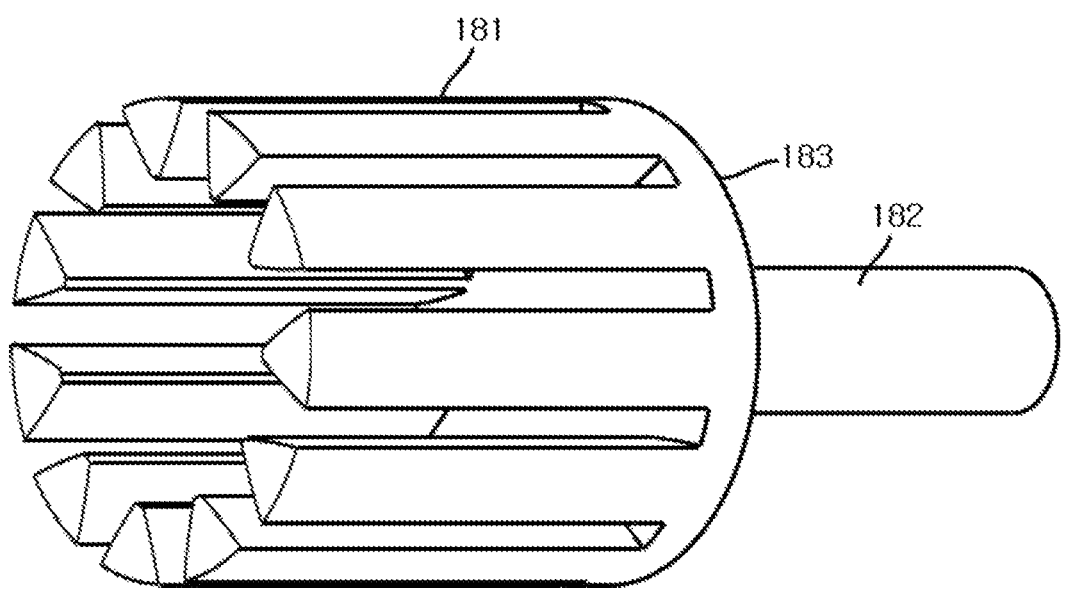
FIG. 18 illustrates a fixed gear 181 used in a variable displacement internal gear pump.
Figure 19:
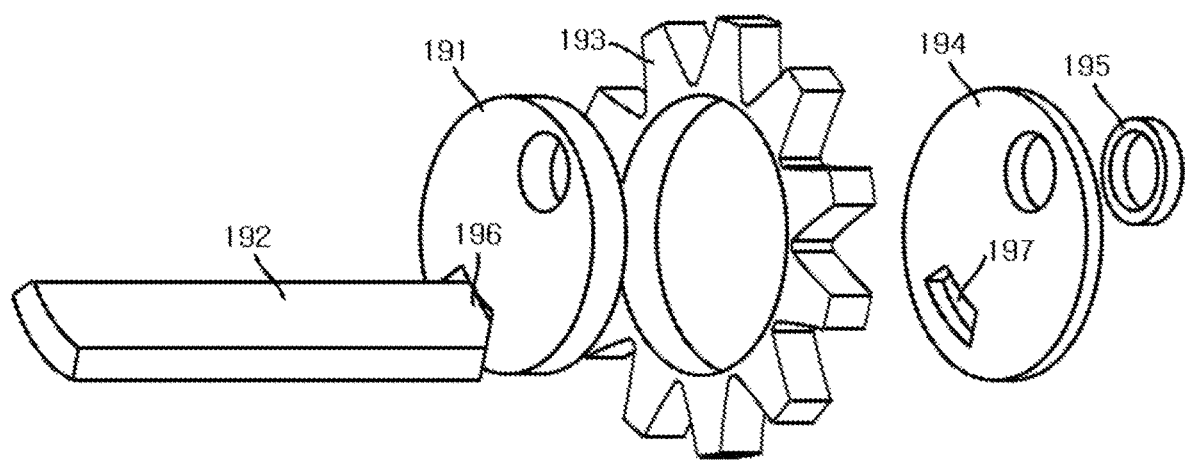
FIG. 19 illustrates a gear block 191, a movable crescent plate 192, a movable gear ring 193, and an anti-escape plate 194 which are used in a variable displacement internal gear pump. The movable crescent plate 192 is attached to the gar block 191. A fixed crescent plate hole 196 is formed above the movable crescent plate 192 in the gear block 191 to allow a fixed crescent plate 214 to pass therethrough. A fixed crescent plate hole 197 is formed in the anti-escape plate 194.
Figure 20:
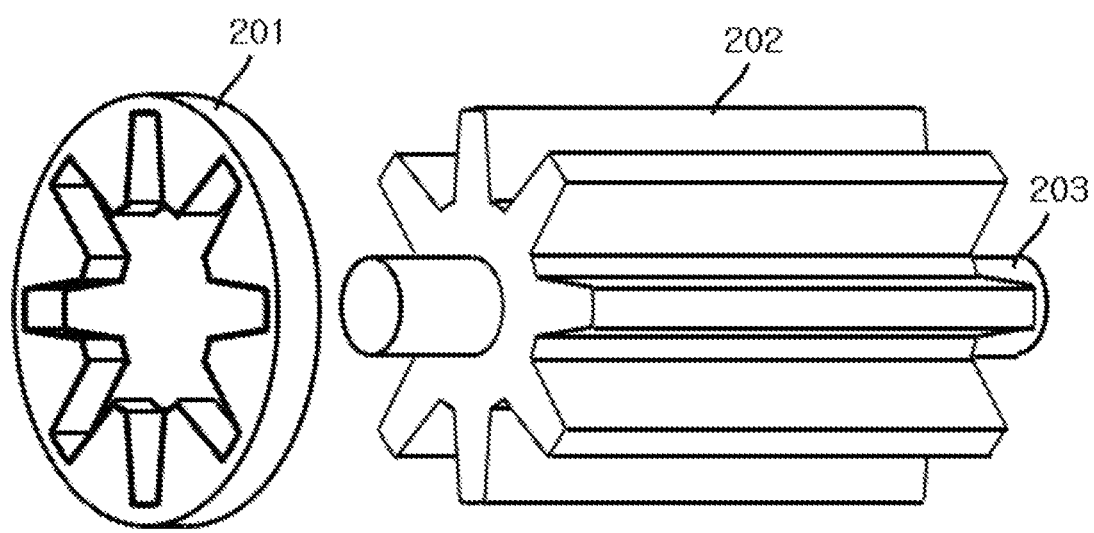
FIG. 20 illustrates a fixed gear ring 201 and a movable gear 202 which are used in a variable displacement internal gear pump. The fixed gear ring 201 may be fitted over the movable gear 202 to move without causing a fluid leak. As necessary, the movable gear 202 may be fixed to a movable gear shaft 203 to rotate along with the movable gear shaft 203 or may be configured not to be fixed free from rotation together with the movable gear shaft 203.
Figure 21:
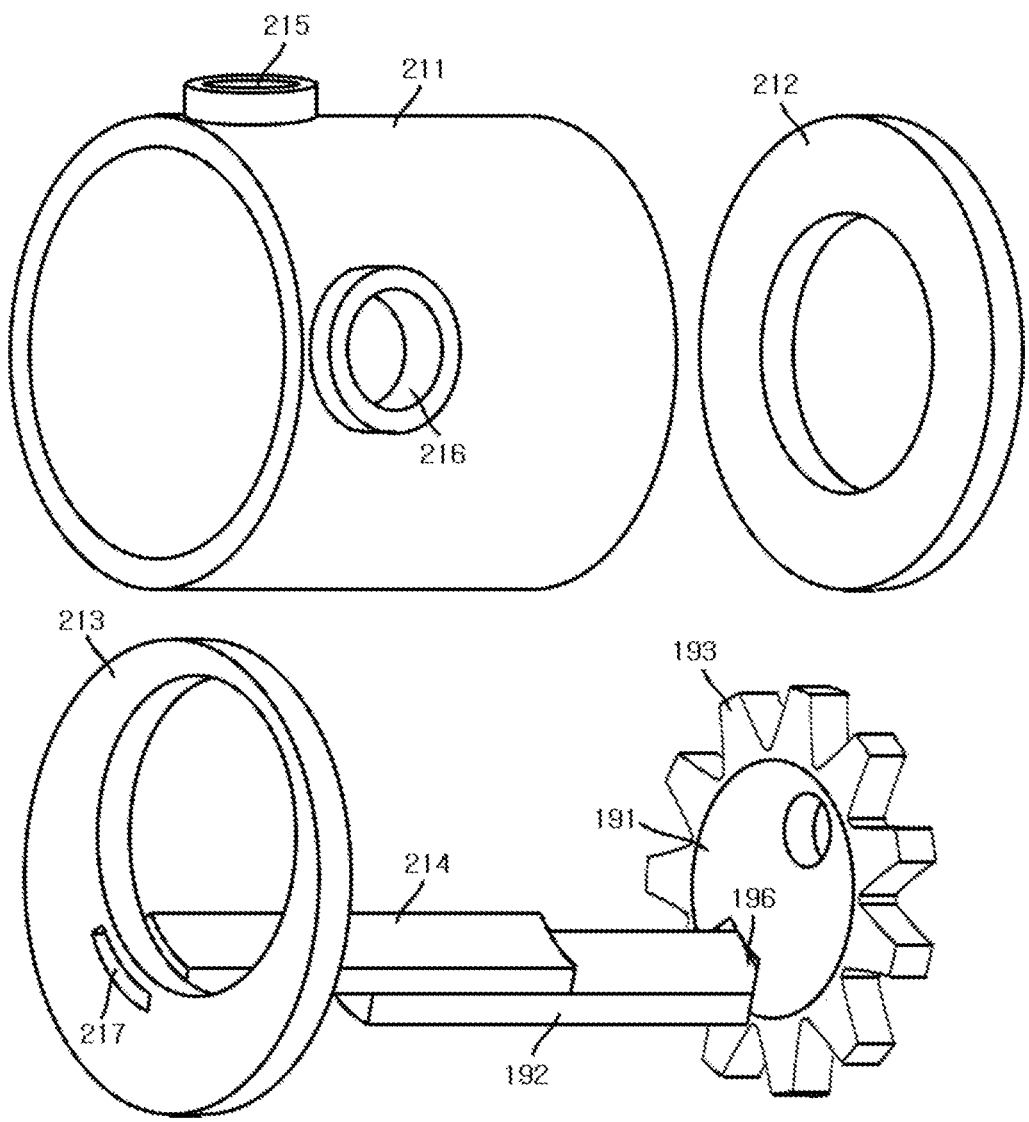
FIG. 21 illustrates a casing 211, a casing cover 212, a fixed gear ring cover 213, a fixed crescent plate 214, and a movable crescent plate hole 217 which are used in a variable displacement internal gear pump. The fixed crescent plate 214 is attached to the fixed gear ring cover 213. A movable crescent plate hole 217 is formed under the fixed crescent plate 214 in the fixed gear ring cover 213 to allow a movable crescent plate 192 to pass therethrough. The gear block 191 of FIG. 19 is shown as assembled with the movable gear ring 193. The fixed crescent plate 214 and the movable crescent plate 192 move while contacting each other.

FIG. 18 illustrates a fixed gear 181 constituting a variable displacement internal gear pump. FIG. 19 illustrates a gear block 191, a movable crescent plate 192, a fixed crescent plate hole 196, a movable gear ring 193, an anti-escape plate 194, and a shaft fixing device 195. FIG. 20 illustrates a fixed gear ring 201. FIG. 21 illustrates a casing 211, a casing cover 212, a fixed gear ring cover 213, a fixed crescent plate 214, and a movable crescent plate hole 217. An example in which the movable crescent plate 192 is attached to the gear block 191 and the movable gear ring 193 is assembled with the gear block 191 is identified from FIG. 21. The anti-escape plate 194 is assembled after the movable gear ring 193 is fitted in the gear block 191. The anti-escape plate 194 is slightly larger in diameter than the gear block 191 to prevent the gear ring 193 from escaping off the gear block 191. The shaft fixing device 195 enables the gear block 191 to stay in a constant position of the movable gear shaft 203 while contacting the side surface of the movable gear 202. The movable gear ring 193 may be fitted in the fixed gear 181 to move to the left or right so that the fluid does not leak while the movable gear ring 193 moves. The fixed gear ring 201 may be fitted over the movable gear 202 to move to the left or right so that the fluid does not leak while the fixed gear ring 201 moves. The fixed crescent plate 214 is attached to the fixed gear ring cover 213. The fixed crescent plate 214 and the movable crescent plate 192 move to the left or right while contacting each other. The fixed crescent plate 214 contacts the teeth tips of the movable gear 202 thereabove and moves through the fixed crescent plate hole 196. The movable crescent plate 192 contacts the fixed gear 181 thereunder and moves through the movable crescent plate hole 217. As the movable gear 202, the gear block 191, the movable gear ring 193, and the movable crescent plate 192 together move to the left or right, the width in which the two gears are engaged with each other may be varied, changing the amount of fluid discharged.

Figure 22:
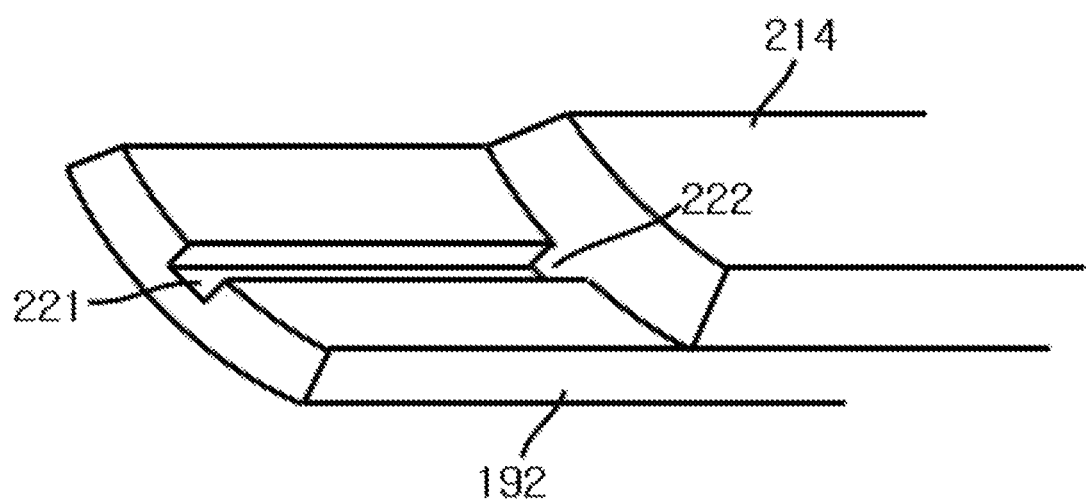
FIG. 22 illustrates an example in which a depression, e.g., a crescent plate groove 221, and a protrusion, e.g., a fixed crescent plate protrusion 222, may be used to prevent the fixed crescent plate 214 and the movable crescent plate 192 from escaping off when moving in contact with each other.

As shown in FIG. 22, a protrusion and a depression, such as a movable crescent plate groove 221 and a fixed crescent plate protrusion 222, may be provided to prevent the fixed crescent plate 214 and the movable crescent plate 192 from escaping off each other while the plates 214 and 192 move in contact with each other. This helps preventing the gear block 191 from rotating along with the movable gear 202 and the movable gear ring 193. The gear block 191 abuts the movable gear ring 193 while supporting one side of the movable gear shaft 203, thus receiving a plenty of rotation force. In case of failing to receive a sufficient force to prevent the gear block 191 from rotating by the protrusion and depression, such as the movable crescent plate groove 221 and the fixed crescent plate protrusion 222, and to allow the movable crescent plate 192 to pass through the movable crescent plate hole 217 and the fixed crescent plate 214 to pass through the fixed crescent plate hole 196, the following methods may be used: more sturdily supporting the movable gear shaft 203 from the outside; allowing the movable gear 202 alone to rotate while stopping the movable gear shaft 203 from rotating and firmly fastening the gear block 191 to the movable gear shaft 203; removing the fixed gear shaft 192 from the fixed gear 181, boring a large hole in the center of the fixed gear plate 183, and making changes to the casing cover 212 as is the gear block cover 113 of FIG. 11, and attaching a block such as the gear block 106 of FIG. 10 to the gear block 191 or the anti-escape plate 194. In such a variation, the movable gear shaft 203 is in charge of transfer of rotation force.

Figure 23:
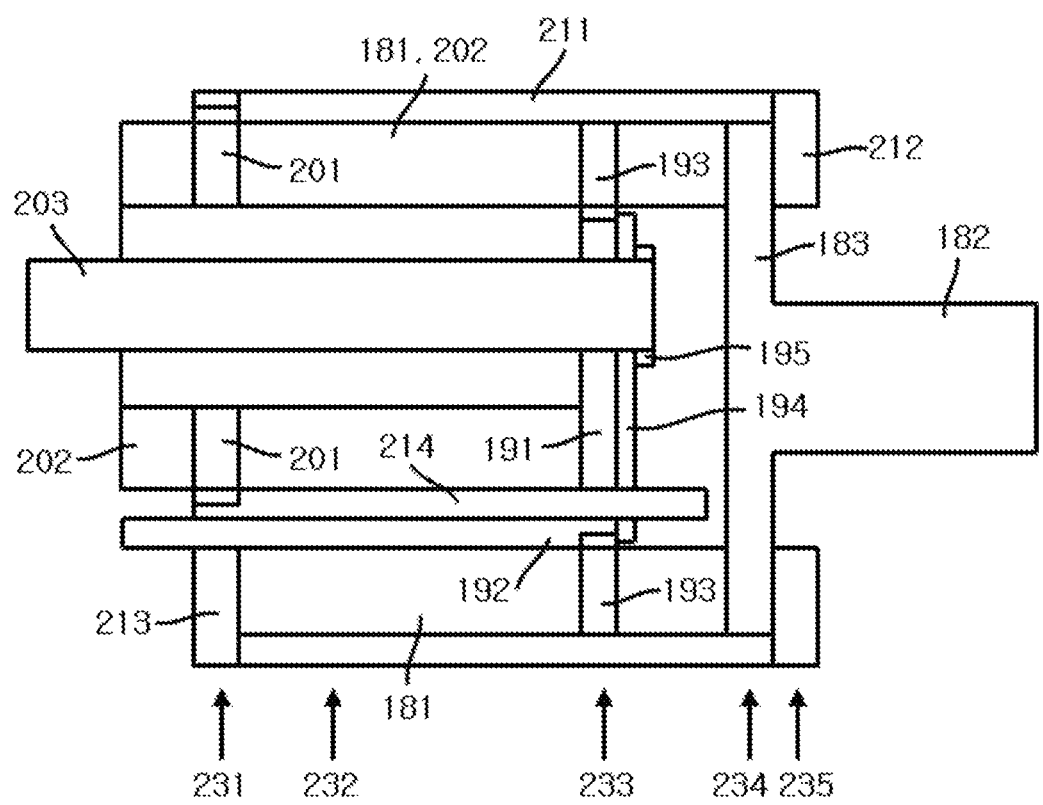
FIG. 23 is a cross-sectional view of a variable displacement internal gear pump assembled is being operated, which is taken in the position denoted with an arrow 251 of FIG. 25.
Figure 24:
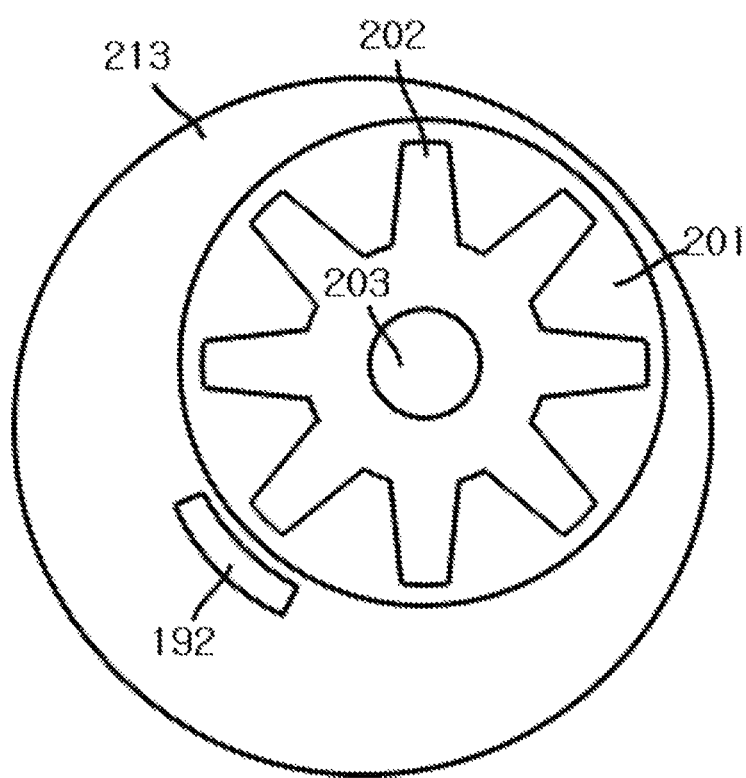
FIG. 24 is a cross-sectional view taken in the position denoted with an arrow 231 of FIG. 23.
Figure 25:
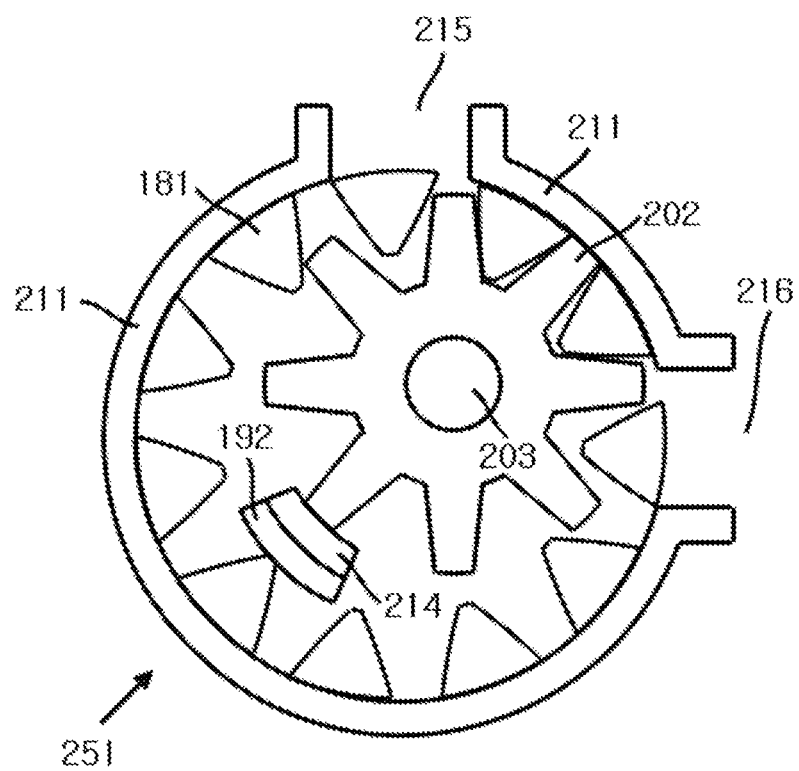
FIG. 25 is a cross-sectional view taken in the position denoted with an arrow 232 of FIG. 23.

FIG. 23 illustrates a cross section of a variable displacement internal gear pump assembled and being in operation, which is taken in the position denoted with arrow 251 of FIG. 25. FIGS. 24 to 28 are cross-sectional views taken in the positions denoted with reference numbers 231 to 235 to show the assembly and operation state in greater detail. As the gear block 191 and the movable gear ring 193 together move to the left or right, the space between the gear block 191 and the fixed gear plate 183 requires free entry/exit of air to remain at a constant air pressure. An air hole may be formed in the fixed gear plate 183.

FIG. 24 is a cross-sectional view taken in the position denoted with arrow 231 of FIG. 23. The fixed gear ring 201 is placed in the larger hole of the fixed gear ring cover 213, the movable gear 202 is fitted in the fixed gear ring 201, and the movable crescent plate 192 passes through the movable crescent plate hole 217 of the fixed gear ring cover 213.

FIG. 25 is a cross-sectional view taken in the position denoted with arrow 232 of FIG. 23. The fixed gear 181 is engaged with the movable gear 202 inside the casing 211. The fixed gear 181, the movable crescent plate 192, the fixed crescent plate 214, and the movable gear 202 sequentially come in contact with each other at the opposite side of the engagement between the two gears, which corresponds to a portion where pumping is performed as the gears rotate.

Figure 26:
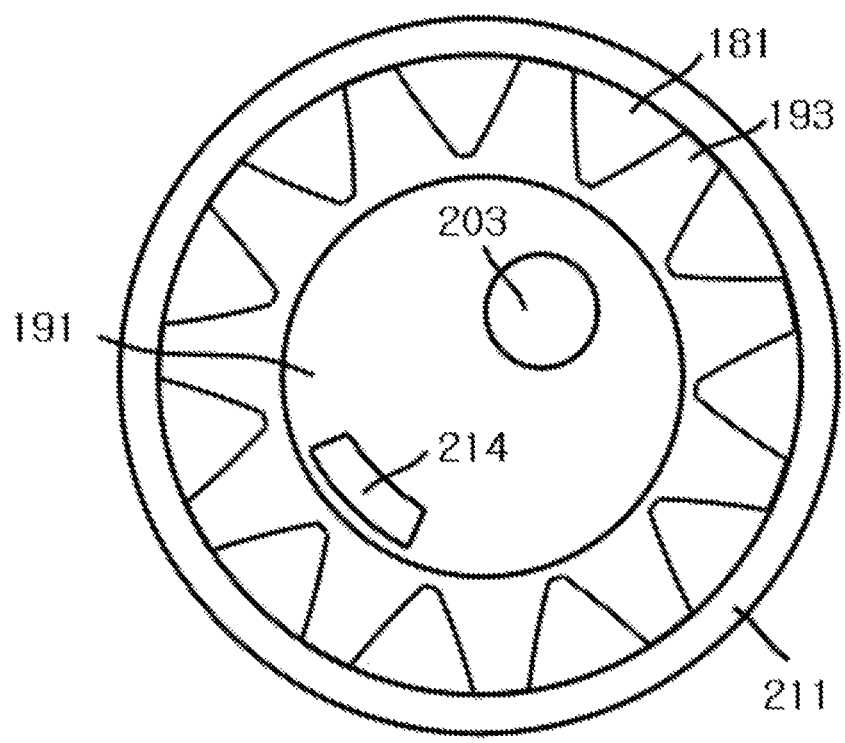
FIG. 26 is a cross-sectional view taken in the position denoted with an arrow 233 of FIG. 23.

FIG. 26 is a cross-sectional view taken in the position denoted with arrow 233 of FIG. 23. The movable gear ring 193 is fitted in the fixed gear 181 inside the casing 211. The gear block 191 is assembled inside the movable gear ring 193. The movable gear shaft 203 passes through the rounded hole of the gear block 191, and the fixed crescent plate 214 passes through the fixed crescent plate hole 196. It can be identified that no gap is present where the engagement between the fixed gear 181 and the movable gear 202 ends, preventing the fluid from leaking.

Figure 27:
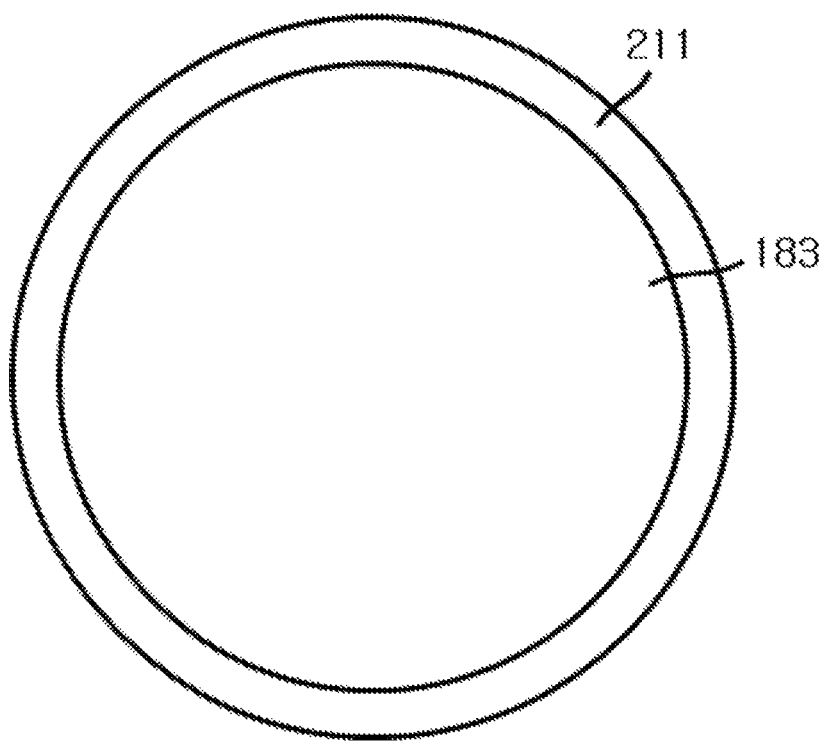
FIG. 27 is a cross-sectional view taken in the position denoted with an arrow 234 of FIG. 23.

FIG. 27 is a cross-sectional view taken in the position denoted with arrow 234 of FIG. 23. The fixed gear plate 183 is placed inside the casing 211.

Figure 28:
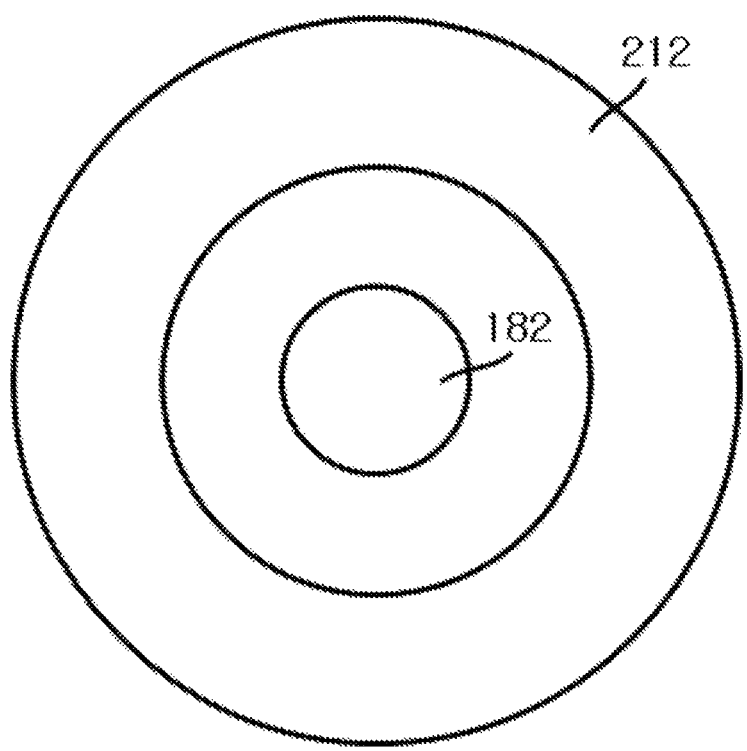
FIG. 28 is a cross-sectional view taken in the position denoted with an arrow 235 of FIG. 23.

FIG. 28 is a cross-sectional view taken in the position denoted with arrow 235 of FIG. 23, wherein the casing cover 212 and the fixed gear shaft 182 are shown.

It can be identified from FIGS. 23 to 26 that the fluid does not leak, and it can be identified from FIG. 25 that as the gears rotate, the fluid flows. It can be identified that the amount of fluid discharged may be adjusted by repositioning the movable gear 202, the gear block 191, the movable gear ring 193, and the movable crescent plate 192 inside the casing 211.

Figure 29:
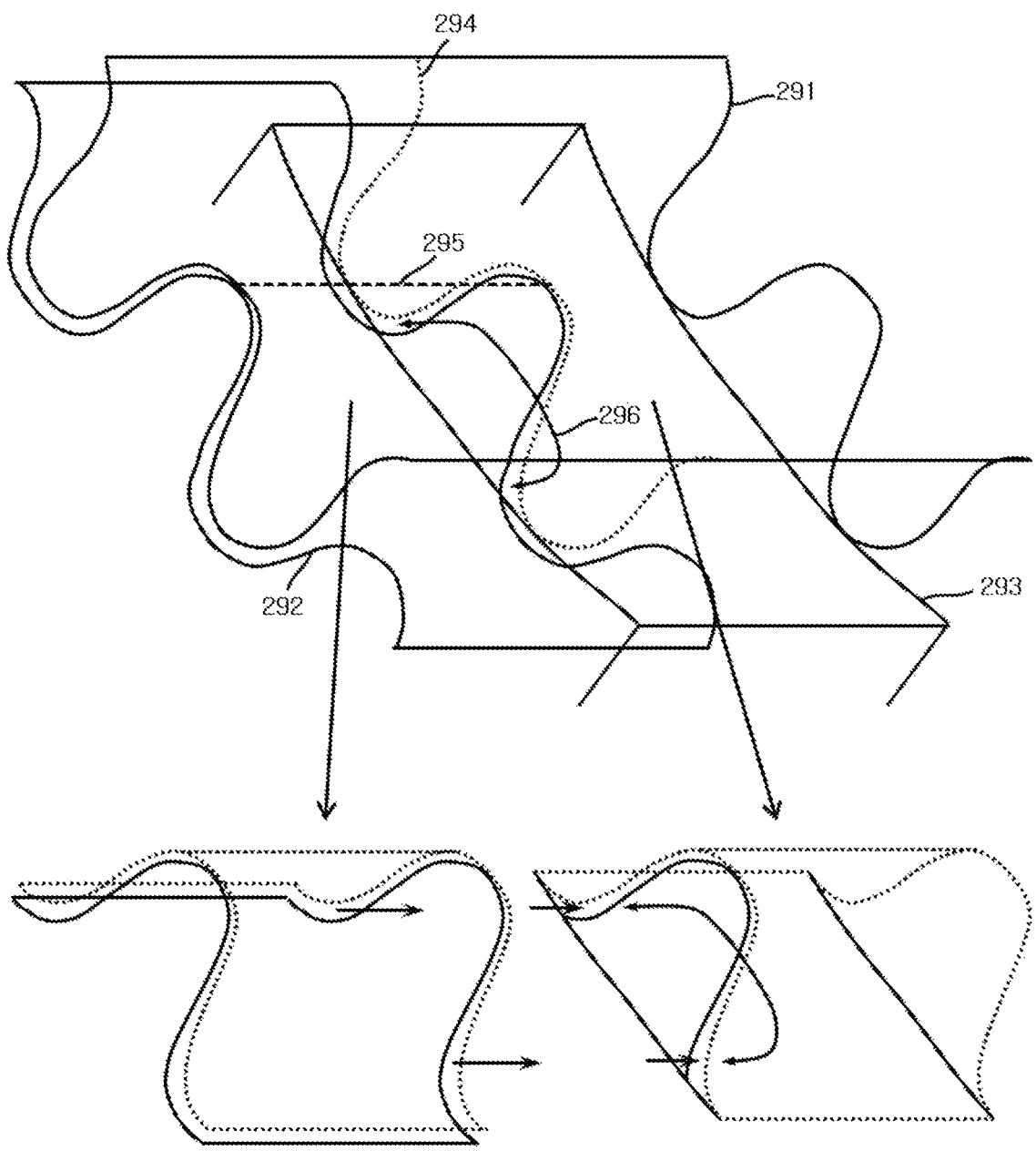
FIG. 29 illustrates a passage through which a fluid leaks in a conventional variable displacement external gear pump.

FIG. 29 illustrates a passage along which fluid leaks which is not known for conventional variable displacement external gear pumps. In some conventional variable displacement external gear pumps, the fixed gear, the movable gear, and the gear block may meet at an edge where the engagement between the fixed gear and the movable gear ends. FIG. 29 shows the surroundings of where the fixed gear, movable gear, and gear block of such a variable displacement external gear pump meet together. In this figure, the left part of the fixed gear 291 is engaged with the movable gear 292. The teeth tips of the right part of the fixed gear 291 abut the gear block 293. The movable gear 292 and the gear block 293 abut each other. A higher-pressure portion and a lower-pressure portion are divided from each other with respect to the virtual tangent line 295 between the fixed gear and the movable gear which is denoted in dashed lines. The fluid cannot go across the tangent line 295 between the fixed gear and the movable gear. The fixed gear periphery line 294 denoted in dotted lines represents the points at which the tip edges of the movable gear 292 touch as the fixed gear 291 rotates. A column-shaped space surrounded and closed by the surface of the valley and teeth of the fixed gear 291, the gear block 293, and the right-side surface of one tooth of the movable gear 292, and the casing cover may be formed around the center of where the teeth of the fixed gear 291 and the gear block 293 abut. A more careful look at it reveals that one tooth of the movable gear 292 to the left side of the space fails to fit in the space between two neighbor teeth of the fixed gear 291 without leaving a gap, but rather leaving gaps on the left and right that naturally occur due to engagement of the gears. Thus, the space cannot be completely closed and leaves two gaps to the left, each of which connects to a respective one of the higher-pressure portion and lower-pressure portion of the pump. In other words, the higher-pressure portion and lower-pressure portion of the pump communicate with each other through the space on the right of the movable gear 292. Thus, a failure to block the gaps may result in the pressure in the higher-pressure portion of the pump and the fluid leaking to the lower-pressure portion of the pump, causing a malfunction of the pump. Although FIG. 29 illustrates the variable displacement external gear pump, the same description may also apply to variable displacement trochoid gear pumps. Indeed, some trochoid gear pumps suffer the same problems. Upon redrawing FIG. 29 to fit for a variable displacement trochoid gear pump, reference number 291 may be a fixed gear or outer rotor, reference number 292 may be a movable gear or inner rotor, and reference number 293 may be a gear block or active piston. Likewise, FIG. 29 may be applicable to variable displacement internal gear pumps. Indeed, some variable displacement internal gear pumps have the same issues. Upon redrawing FIG. 29 to fit for a variable displacement internal gear pump, reference number 291 is a fixed gear, reference number 292 is a movable gear, and reference number 293 is a gear block.

FIGS. 31 to 41 illustrate a method for making some more minor changes to those shown in FIGS. 18 to 28 to more firmly support the gear block 321 to prevent rotation of the gear block 321.

Figure 31:
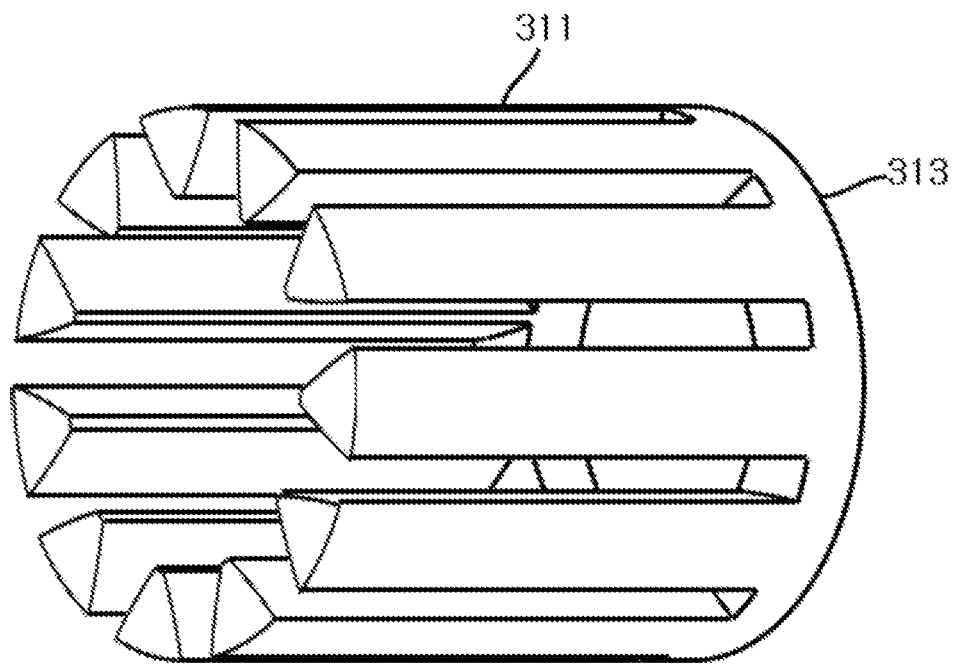
FIG. 31 illustrates a fixed gear 311 used in a variable displacement internal gear pump, which, as contrasted to that shown in FIG. 18, lacks the fixed gear shaft 182 and has an opening in the center of a fixed gear plate 313.

FIG. 31 illustrates a fixed gear 311 and a fixed gear plate 313. As compared with FIG. 18, no fixed gear shaft 182 is provided, and the fixed gear plate 313 has a large central hole.

Figure 32:
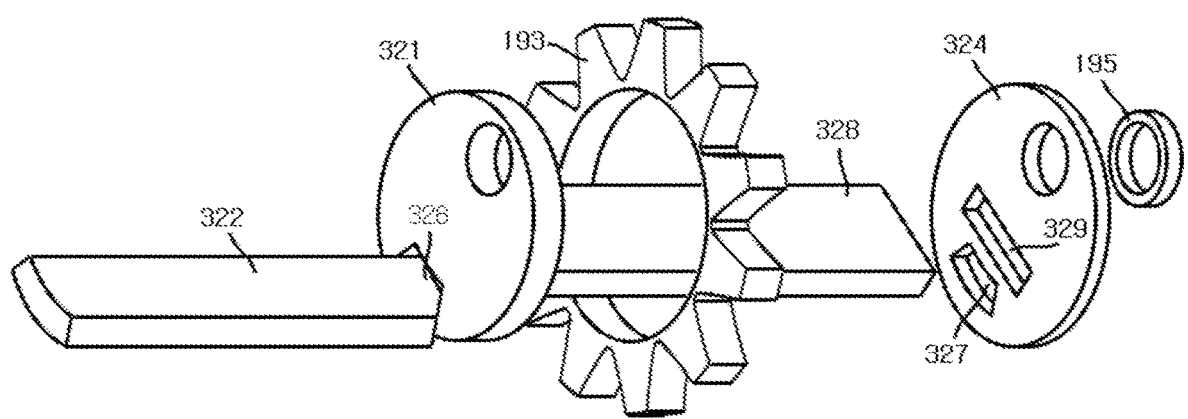
FIG. 32 illustrates a gear block 321, a movable crescent plate 322, a movable gear ring 193, an anti-escape plate 324, a gear block supporting plate 328, and a gear block supporting plate hole 329 which are used in a variable displacement internal gear pump. The gear block supporting plate 328 is attached to the gear block 321 and passes through the gear block supporting plate hole 329 formed in the anti-escape plate 324.

As compared with FIG. 19, FIG. 32 illustrates an example in which the gear block supporting plate 328 is attached to a gear block 321. Since an anti-escape plate 324 is firmly fastened to the gear block 321, the gear block supporting plate 328 may be attached to the anti-escape plate 324. The anti-escape plate 324 has a gear block supporting plate hole 329.

Figure 33:
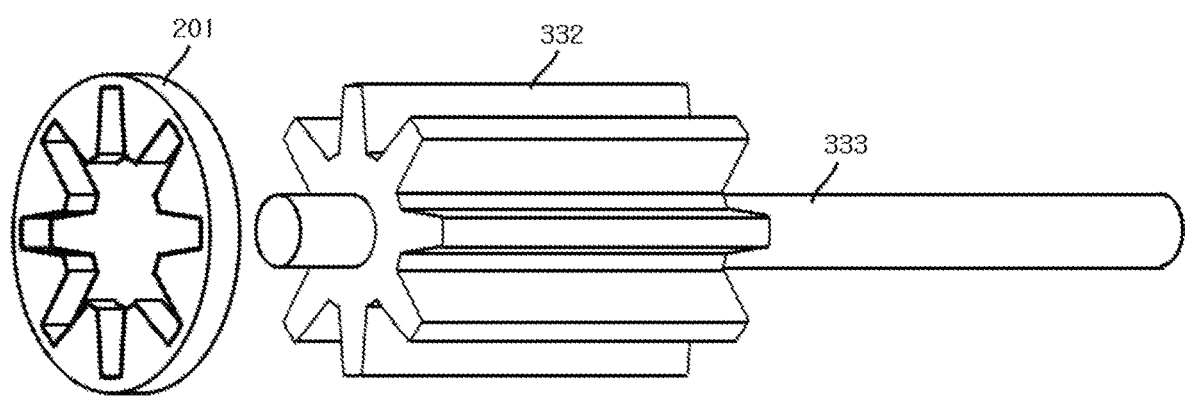
FIG. 33 illustrates a fixed gear ring 201 and a movable gear 332 used in a variable displacement internal gear pump. The movable gear shaft 333 is longer than that shown in FIG. 20.

Referring to FIG. 33, the movable gear shaft 333 is slightly longer than that shown in FIG. 20.

Figure 34:
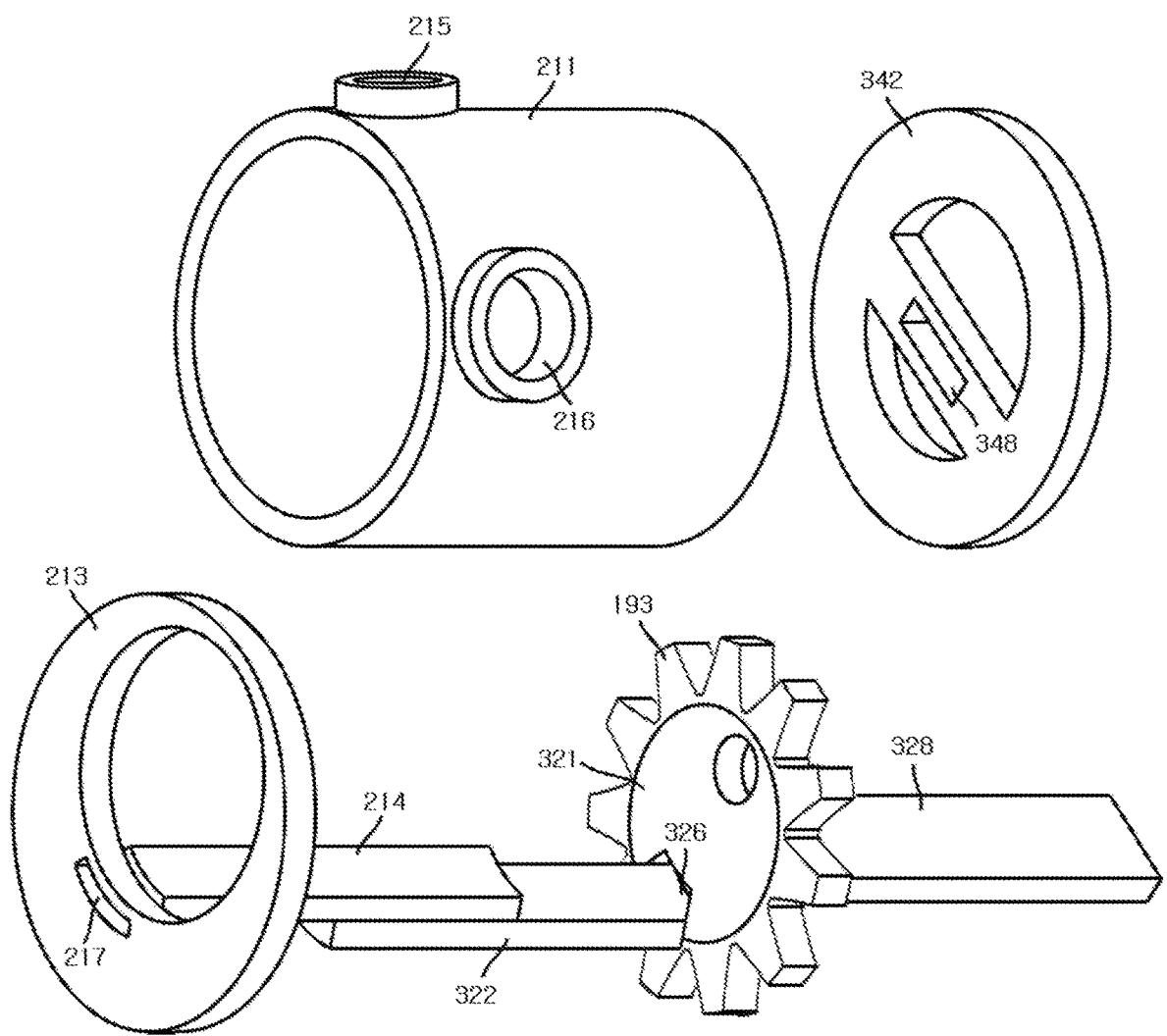
FIG. 34 illustrates a casing 211, a casing cover 342, a fixed gear ring cover 213, a fixed crescent plate 214, a gear block 321, a movable crescent plate 322, a movable gear ring 193, a gear block supporting plate 328 attached to the gear block 321, and a gear block supporting plate hole 348 formed in the casing cover 342. The gear block supporting plate 328 passes and moves through the gear block supporting plate hole 348 formed in the casing cover 342.

As compared with FIG. 21, FIG. 34 illustrates an example in which a gear block supporting plate 348 is formed in the casing cover 342, and the gear block supporting plate 328 is attached to the gear block 321. The gear block supporting plate 328 would move through the gear block supporting plate hole 348.

Figure 35:
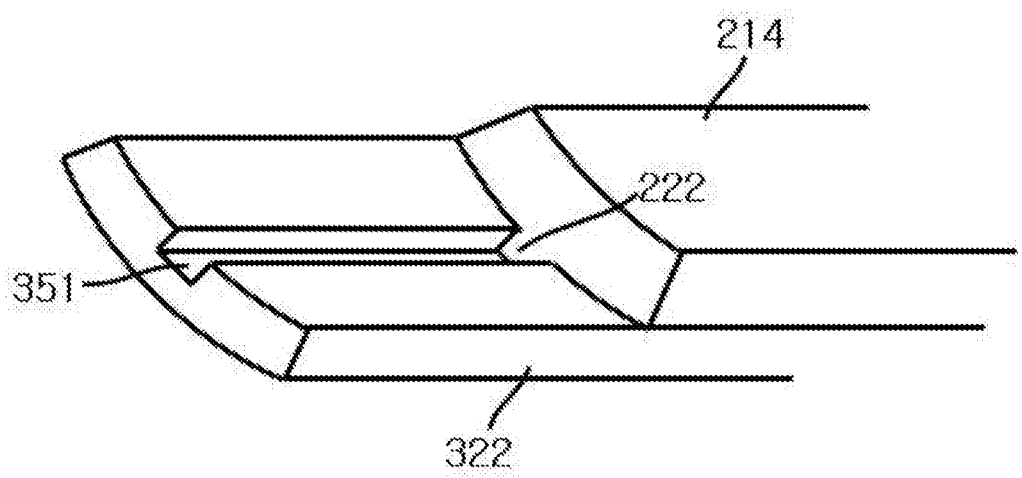
FIG. 35 is the same as FIG. 22.

FIG. 35 is the same as FIG. 22.

Figure 36:
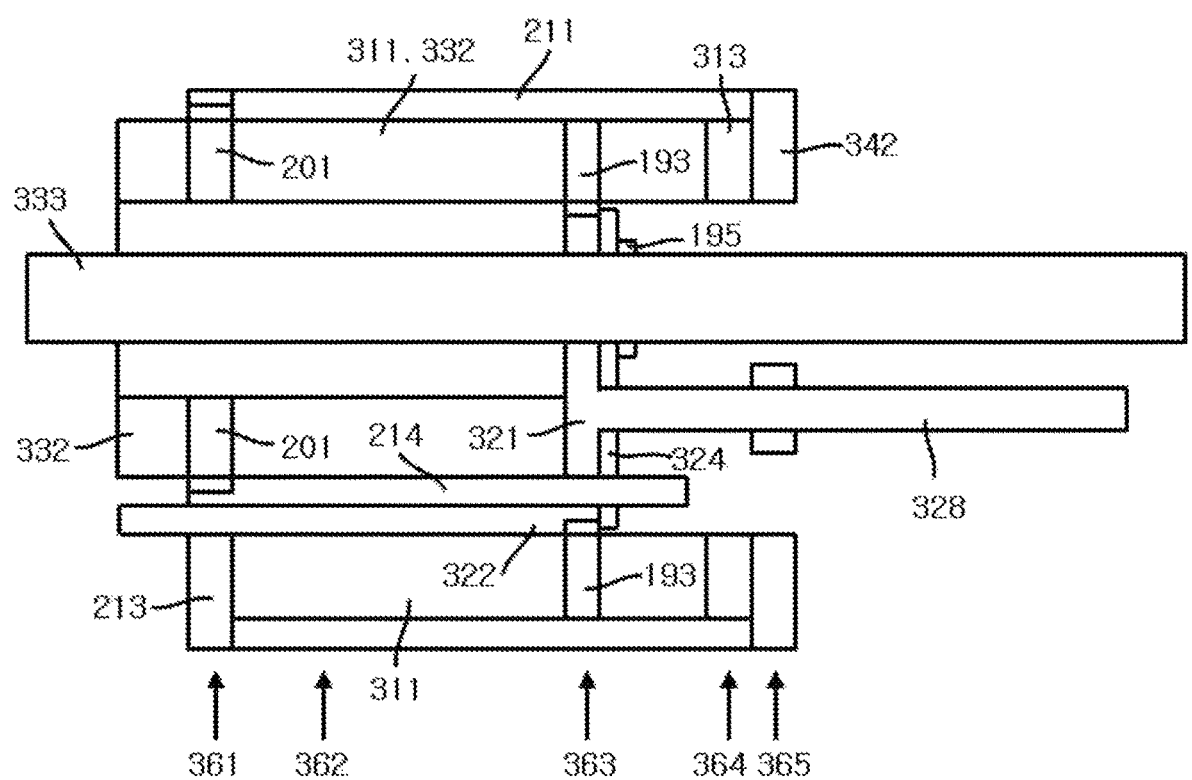
FIG. 36 is a cross-sectional view of a variable displacement internal gear pump assembled and being operated, which is taken in the position denoted with an arrow 381 of FIG. 38.
Figure 37:
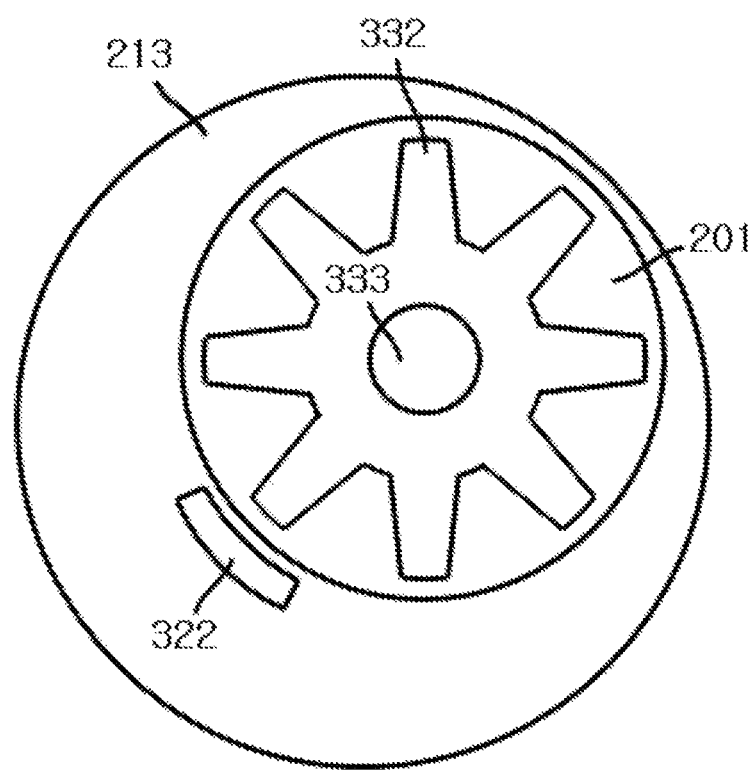
FIG. 37 is a cross-sectional view taken in the position denoted with an arrow 361 of FIG. 36.
Figure 38:
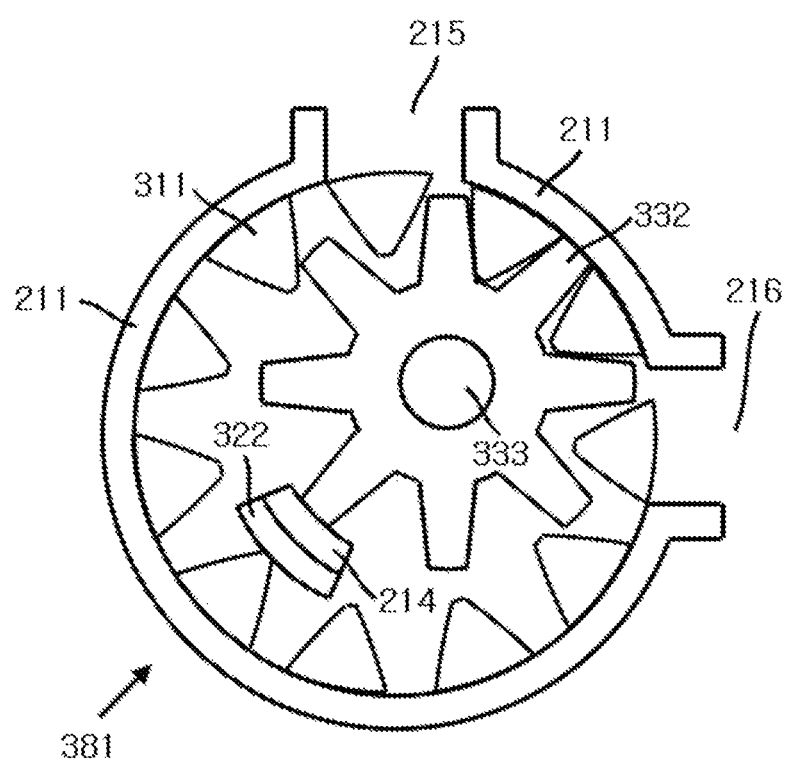
FIG. 38 is a cross-sectional view taken in the position denoted with an arrow 362 of FIG. 36.

FIG. 36 illustrates a cross section of an assembled variable displacement internal gear pump being in operation, which is a cross-sectional view taken in the position denoted with arrow 381 of FIG. 38. FIGS. 37 to 41 are cross-sectional views taken in the positions denoted with reference numbers 361 to 365 to describe the assembly and operation state in greater detail.

FIG. 37 is a cross-sectional view taken in the position denoted with arrow 361 of FIG. 36. The same description given for FIG. 24 applies to FIG. 37.

FIG. 38 is a cross-sectional view taken in the position denoted with arrow 362 of FIG. 36. The same description given for FIG. 25 applies to FIG. 38.

Figure 39:
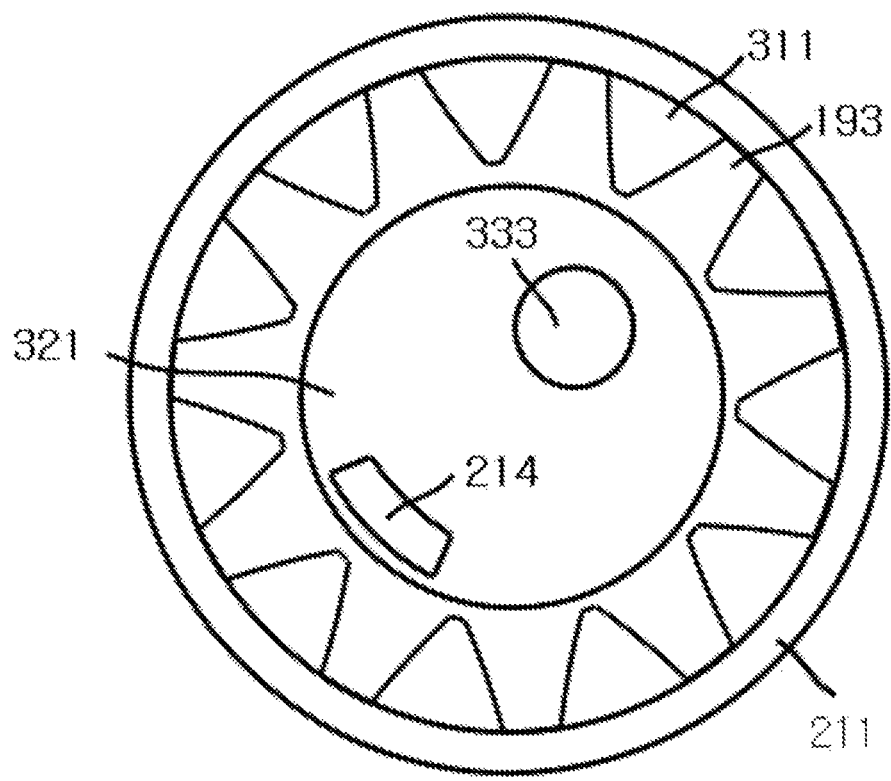
FIG. 39 is a cross-sectional view taken in the position denoted with an arrow 363 of FIG. 36.

FIG. 39 is a cross-sectional view taken in the position denoted with arrow 363 of FIG. 36. The same description given for FIG. 26 applies to FIG. 39.

Figure 40:
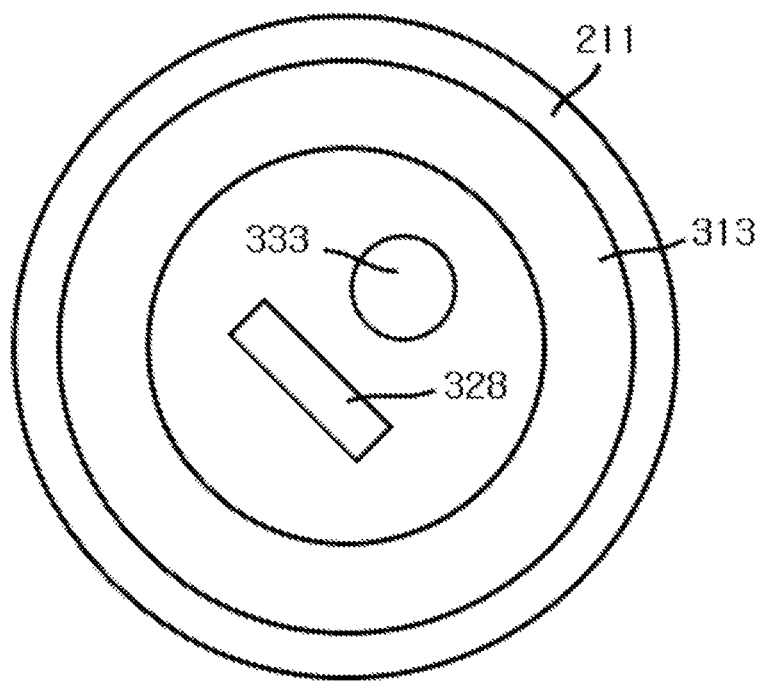
FIG. 40 is a cross-sectional view taken in the position denoted with an arrow 364 of FIG. 36.

FIG. 40 is a cross-sectional view taken in the position denoted with arrow 364 of FIG. 36. The fixed gear plate 313, the gear block supporting plate 328, and the movable gear shaft 333 are present inside the casing 211.

Figure 41:
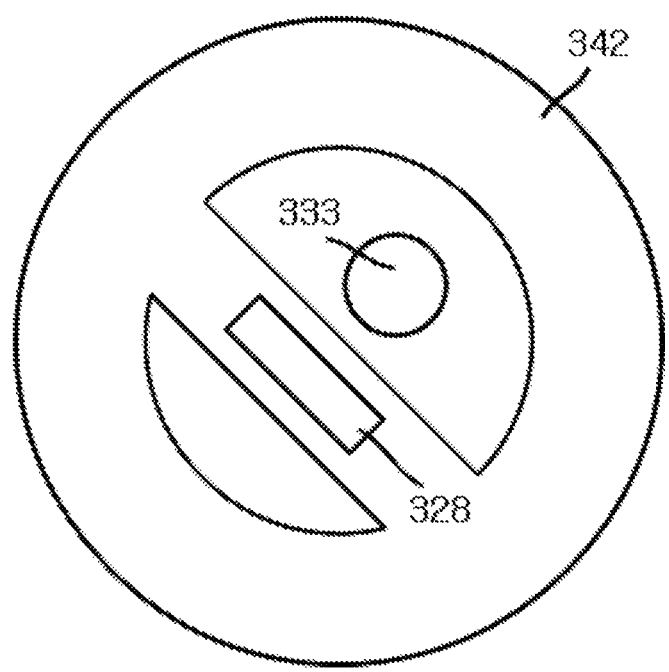
FIG. 41 is a cross-sectional view taken in the position denoted with an arrow 365 of FIG. 36.

FIG. 41 is a cross-sectional view taken in the position denoted with arrow 365 of FIG. 36. The gear block supporting plate 328 and the movable gear shaft 333 are formed in the casing cover 342.

It can be identified from FIGS. 36 to 39 that no fluid leak occurs. It can be identified from FIG. 38 that as the gears rotate, the fluid flows. It can be identified that the amount of fluid discharged may be adjusted by repositioning the movable gear 332, the gear block 321, the movable gear ring 193, and the movable crescent plate 322 inside the casing 211.

FIG. 42 illustrates a variation to the variable displacement external gear pump of FIG. 8. The gear blocks 85 and 86 of FIG. 8 are reshaped into a fixed gear block 425 and a movable gear block 426 so that the two gear blocks directly touch each other. The gear block holes 73 and 74 of FIG. 8 are reshaped into a fixed gear block hole 423 and a movable gear block hole 424. By so doing, the casing 22 of FIG. 2 is unnecessary. While the variable displacement external gear pump of FIG. 8 requires precise process on the floor, the variable displacement external gear pump of FIG. 42 may more easily be installed on the bottom of, e.g., an oil tank or crank chamber, free from the floor. When no casing is provided, the operation needs to be performed with the two gears sufficiently soaked in the fluid. The fluid hole 427 allows a pipe to connect therethrough and may be used as an outlet or inlet.

FIG. 43 illustrates an example of avoiding use of a gear block and a gear block hole by replacing the fixed cover 21, casing 22, movable cover 23, and movable gear block 24 of FIG. 2 with a fixed cover 431, a casing 432, a movable cover 433, and a movable casing 434, respectively. A portion of the casing 432, where the teeth tips of the movable gear abut is referred to as the fixed casing 438. The same fixed gear, movable gear, fixed gear ring, and movable gear ring as those shown in FIG. 1 may be adopted to form the variable displacement external gear pump. This may be used in an environment where processing the movable cover is easier than processing the gear block and gear block hole.

FIG. 44 is a cross-sectional view illustrating an example of constituting a variable displacement external gear pump with those shown in FIGS. 1 and 43.

FIG. 45 illustrates a structure in which no casing is used as contrasted to the method of FIG. 43 which uses the casing 432. The same fixed gear, movable gear, fixed gear ring, and movable gear ring as those shown in FIG. 1 may be used to make the variable displacement external gear pump. The fixed casing 455 and the movable casing 456 touch sideby-side, preventing a fluid leak. It is preferable to operate with them soaked in the fluid.

A variable displacement gear pump may be used to keep a fluid flow constant when the rotation speed of the shaft, such as in a vehicular oil pump, frequently fluctuates in a large amplitude or be used when the fluid flow requires other significant changes regardless of the rotation speed of the shaft while the rotation speed of the shaft fluctuates, such as in the air conditioner of an automobile. The variable displacement gear pump may also be used to enable precise, fine temperature adjustment by gradually reducing the amount of coolant discharged as the temperature measurement in a refrigerator or air conditioner using an AC motor comes close to a set temperature. This is why AC motors are prone to control temperature by turning on and off due to difficulty in adjusting their rotation speed, with the result of a significant change in temperature around the set temperature. The variable displacement gear pump may be used in places where a significant variation in flowrate arises or may be intended for, e.g., a tank, bulldozer, or excavator, which changes the direction by applying different speeds to the left and right wheels in the caterpillar tracks during the rotation of the wheels using a continuously variable transfer case. If a hydraulic motor is connected to each of the left wheel and right wheel in a normal automobile, the left-to-right differential motion may actively be implemented according to the redirection of the automobile. In the hydraulic apparatus, the variable displacement gear pump may easily lead to a change in flowrate and pressure, and the variable displacement gear motor may easily lead to a change in torque. By using the same, a continuously variable transmission may be produced.

What is claimed is:

1. A variable displacement gear pump, comprising:
   a fixed gear rotating in place;
   a movable gear rotating in a direction of rotation of a movable gear shaft;
   a fixed gear ring fitted over the movable gear to be movable along a direction of the movable gear shaft;
   a movable gear ring fitted in the fixed gear to be movable along a direction of a fixed gear shaft;
   a gear block having a fixed crescent plate hole and fitted in the movable gear ring;
   a fixed gear ring cover having a hole in which the fixed gear ring rotates and a movable crescent plate hole;
   a movable crescent plate attached to the gear block;
   a fixed crescent plate attached to the fixed gear ring cover; and
   a casing containing the fixed gear, the movable gear, the movable gear ring, the gear block, the fixed crescent plate, and the movable crescent plate, wherein the fixed gear is engaged with the movable gear, wherein the fixed gear ring fitted over the movable gear rotates in the hole of the fixed gear ring cover, wherein the fixed crescent plate abuts the movable gear, the movable crescent plate abuts the fixed crescent plate and the fixed gear, and the movable gear ring and the gear block. abut a side surface of the movable gear so that the movable gear ring rotates along with the fixed gear, and wherein the movable gear, the movable gear ring, the gear block, and the movable crescent plate together move along the direction of the movable gear shaft to change a width in which the fixed gear is engaged with the movable gear to adjust the amount of a fluid discharged as the fixed gear makes one full turn.

2. The variable displacement gear pump of claim 1, further comprising a gear block supporting plate and a casing cover having a gear block supporting plate hole, wherein the gear block supporting plate is attached to the gear block, and the gear block supporting plate is allowed to pass through the gear block supporting plate hole in the casing cover.

* * * * *